(12) United States Patent
Petrzilek et al.

(10) Patent No.: US 9,183,991 B2
(45) Date of Patent: Nov. 10, 2015

(54) ELECTRO-POLYMERIZED COATING FOR A WET ELECTROLYTIC CAPACITOR

(71) Applicant: AVX Corporation, Fountain Inn, SC (US)

(72) Inventors: Jan Petrzilek, Usti nad Orlici (CZ); Martin Biler, Lanskroun (CZ); Mitchell D. Weaver, Simpsonville, SC (US)

(73) Assignee: AVX Corporation, Fountain Inn, SC (US)

( * ) Notice: Subject to any disclaimer, the term of this patent is extended or adjusted under 35 U.S.C. 154(b) by 241 days.

(21) Appl. No.: 14/027,321

(22) Filed: Sep. 16, 2013

(65) Prior Publication Data
US 2015/0077902 A1 Mar. 19, 2015

(51) Int. Cl.
| | |
|---|---|
| *H01G 9/04* | (2006.01) |
| *H01G 9/08* | (2006.01) |
| *C25D 7/00* | (2006.01) |
| *H01G 9/052* | (2006.01) |
| *C25D 3/50* | (2006.01) |
| *C25D 11/04* | (2006.01) |
| *C25D 11/26* | (2006.01) |
| *C23C 18/44* | (2006.01) |

(52) U.S. Cl.
CPC .. *H01G 9/08* (2013.01); *C25D 7/00* (2013.01); *H01G 9/052* (2013.01); *C23C 18/44* (2013.01); *C25D 3/50* (2013.01); *C25D 11/04* (2013.01); *C25D 11/26* (2013.01)

(58) Field of Classification Search
CPC ............ H01G 9/08; H01G 9/10; H01G 9/15; H01G 9/00
USPC ......... 361/516, 504, 508–509, 517, 518, 519, 361/523–525, 528–529
See application file for complete search history.

(56) References Cited

U.S. PATENT DOCUMENTS

| | | |
|---|---|---|
| 3,628,103 A | 12/1971 | Booe |
| 4,017,302 A | 4/1977 | Bates et al. |
| 4,441,927 A | 4/1984 | Getz et al. |
| 4,483,819 A | 11/1984 | Albrecht et al. |
| 4,523,255 A | 6/1985 | Rogers |
| 4,555,268 A | 11/1985 | Getz |
| 4,683,516 A | 7/1987 | Miller |
| 4,780,797 A | 10/1988 | Libby |
| 4,864,472 A | 9/1989 | Yoshimura |

(Continued)

OTHER PUBLICATIONS

Abstract of Japanese Patent—JP2011225690, Nov. 10, 2011, 1 page.

(Continued)

*Primary Examiner* — Nguyen T Ha
(74) *Attorney, Agent, or Firm* — Dority & Manning, P.A.

(57) ABSTRACT

A wet electrolytic capacitor that contains a casing within which is positioned an anode formed from an anodically oxidized sintered porous body and a fluidic working electrolyte is provided. The casing contains a conductive coating disposed on a surface of a metal substrate. The casing contains a metal substrate coated with a conductive coating. The conductive coating contains a conductive polymer layer formed through anodic electrochemical polymerization ("electro-polymerization") of a colloidal suspension on the surface of the metal substrate. The conductive coating also contains a precoat layer that is discontinuous in nature and contains a plurality of discrete projections of a conductive material that are deposited over the surface of the metal substrate in a spaced-apart fashion so that they form "island-like" structures.

30 Claims, 5 Drawing Sheets

(56) References Cited

U.S. PATENT DOCUMENTS

| | | | |
|---|---|---|---|
| 4,942,500 A | 7/1990 | Libby et al. |
| 4,943,892 A | 7/1990 | Tsuchiya et al. |
| 4,960,471 A | 10/1990 | Fife et al. |
| 5,019,949 A | 5/1991 | Ikeda et al. |
| 5,043,849 A | 8/1991 | Libby |
| 5,071,521 A | 12/1991 | Kojima et al. |
| 5,082,491 A | 1/1992 | Rerat |
| 5,111,327 A | 5/1992 | Blohm et al. |
| 5,117,332 A | 5/1992 | Kudoh et al. |
| 5,119,274 A | 6/1992 | Kinuta et al. |
| 5,187,649 A | 2/1993 | Kudoh et al. |
| 5,187,650 A | 2/1993 | Kudoh et al. |
| 5,232,169 A | 8/1993 | Kaneko et al. |
| 5,369,547 A | 11/1994 | Evans |
| 5,424,907 A | 6/1995 | Kojima et al. |
| 5,457,862 A | 10/1995 | Sakata et al. |
| 5,473,503 A | 12/1995 | Sakata et al. |
| 5,522,558 A | 6/1996 | Kaneko |
| 5,726,118 A | 3/1998 | Ivey et al. |
| 5,729,428 A | 3/1998 | Sakata et al. |
| 5,812,367 A | 9/1998 | Kudoh et al. |
| 5,858,911 A | 1/1999 | Wellen et al. |
| 5,954,856 A | 9/1999 | Pathare et al. |
| 6,088,218 A | 7/2000 | Hamada et al. |
| 6,126,097 A | 10/2000 | Chen et al. |
| 6,134,099 A | 10/2000 | Igaki et al. |
| 6,145,765 A | 11/2000 | Capelle, Jr. et al. |
| 6,168,639 B1 | 1/2001 | Taketani et al. |
| 6,197,252 B1 | 3/2001 | Bishop et al. |
| 6,224,639 B1 | 5/2001 | Hamada et al. |
| 6,238,456 B1 | 5/2001 | Wolf et al. |
| 6,239,965 B1 | 5/2001 | Shiraishi et al. |
| 6,313,979 B1 | 11/2001 | Taketani et al. |
| 6,324,050 B1 | 11/2001 | Kobatake et al. |
| 6,361,572 B1 | 3/2002 | Igaki et al. |
| 6,409,777 B2 | 6/2002 | Kobatake et al. |
| 6,426,866 B2 | 7/2002 | Shoji et al. |
| 6,462,936 B1 | 10/2002 | Fujimoto et al. |
| 6,576,038 B1 | 6/2003 | Rao |
| 6,594,140 B1 | 7/2003 | Evans et al. |
| 6,614,063 B2 | 9/2003 | Hayashi et al. |
| 6,635,729 B1 | 10/2003 | Groenendaal et al. |
| 6,671,168 B2 | 12/2003 | Yoshida et al. |
| 6,687,116 B2 | 2/2004 | Hudis |
| 6,733,545 B2 | 5/2004 | Shoji et al. |
| 6,791,821 B1 | 9/2004 | Monnett |
| 6,804,109 B1 * | 10/2004 | Hahn et al. ............... 361/524 |
| 6,853,540 B2 | 2/2005 | Kudoh et al. |
| 6,885,547 B2 | 4/2005 | Nitta et al. |
| 6,987,663 B2 | 1/2006 | Merker et al. |
| 7,125,764 B2 | 10/2006 | Taketani et al. |
| 7,157,326 B2 | 1/2007 | Suda |
| 7,180,728 B2 | 2/2007 | Kobayashi |
| 7,248,461 B2 | 7/2007 | Takagi et al. |
| 7,256,982 B2 * | 8/2007 | Lessner et al. ............ 361/516 |
| 7,262,954 B1 | 8/2007 | Iida et al. |
| 7,374,585 B2 | 5/2008 | Yoshimitsu et al. |
| 7,479,166 B2 | 1/2009 | Ito |
| 7,511,943 B2 * | 3/2009 | Fife et al. ............... 361/516 |
| 7,515,396 B2 | 4/2009 | Biler |
| 7,649,730 B2 * | 1/2010 | Jones et al. ............ 361/523 |
| 7,729,103 B2 | 6/2010 | Kato et al. |
| 7,742,281 B2 | 6/2010 | Goto et al. |
| 7,760,490 B2 | 7/2010 | Takatani et al. |
| 7,800,887 B2 | 9/2010 | Iida et al. |
| 7,821,772 B2 | 10/2010 | Kobayashi et al. |
| 7,842,104 B2 | 11/2010 | Yoshimitsu |
| 7,862,852 B2 | 1/2011 | Lee |
| 7,876,549 B2 | 1/2011 | Umemoto et al. |
| 8,027,151 B2 | 9/2011 | Kikuchi et al. |
| 8,035,953 B2 | 10/2011 | Nemoto et al. |
| 8,050,014 B2 | 11/2011 | Iwasa et al. |
| 8,057,553 B2 | 11/2011 | Iwasa et al. |
| 8,083,920 B2 | 12/2011 | Yoshimitsu |
| 8,116,068 B2 | 2/2012 | Nishimura |
| 8,206,467 B2 | 6/2012 | Hayashi et al. |
| 8,213,158 B2 | 7/2012 | Takatani et al. |
| 8,218,290 B2 | 7/2012 | Ota et al. |
| 8,228,661 B2 | 7/2012 | Ito et al. |
| 8,273,135 B2 | 9/2012 | Furukawa et al. |
| 8,279,585 B2 | 10/2012 | Dreissig et al. |
| 8,363,385 B2 | 1/2013 | Yoshimitsu |
| 8,405,958 B2 | 3/2013 | Takahashi et al. |
| 8,422,201 B2 | 4/2013 | Harada et al. |
| 8,425,805 B2 | 4/2013 | Harada et al. |
| 8,441,776 B2 | 5/2013 | Komatsu et al. |
| 8,470,389 B2 | 6/2013 | Furukawa et al. |
| 8,503,167 B2 | 8/2013 | Ota et al. |
| 8,514,547 B2 | 8/2013 | Galvagni et al. |
| 8,568,616 B2 | 10/2013 | Hsu et al. |
| 8,605,451 B2 | 12/2013 | Biler et al. |
| 8,971,019 B2 * | 3/2015 | Biler ......................... 361/504 |
| 8,971,020 B2 * | 3/2015 | Biler et al. .................. 361/516 |
| 2009/0231782 A1 | 9/2009 | Fujita et al. |
| 2009/0237863 A1 | 9/2009 | Breithaupt et al. |
| 2010/0157510 A1 | 6/2010 | Miyachi et al. |
| 2010/0172068 A1 | 7/2010 | Yoshimitsu |
| 2010/0182736 A1 | 7/2010 | Miyachi et al. |
| 2010/0193745 A1 | 8/2010 | Harada et al. |
| 2010/0271757 A1 | 10/2010 | Ishikawa et al. |
| 2010/0302714 A1 | 12/2010 | Kobayakawa et al. |
| 2011/0051319 A1 | 3/2011 | Ishikawa et al. |
| 2011/0122546 A1 | 5/2011 | Nobuta et al. |
| 2011/0211295 A1 | 9/2011 | Ueda et al. |
| 2011/0233450 A1 | 9/2011 | Nobuta et al. |
| 2012/0069491 A1 | 3/2012 | Biler |
| 2013/0155580 A1 | 6/2013 | Karnik et al. |
| 2013/0242465 A1 | 9/2013 | Weaver et al. |
| 2013/0242466 A1 | 9/2013 | Masheder et al. |
| 2013/0242468 A1 | 9/2013 | Pinwill et al. |

OTHER PUBLICATIONS

Abstract of Article—Choi et al., "Poly(3,4-ethylenedioxythiophene) nanoparticles prepared in aqueous DBSA solutions," *Snythetic Metals*, vol. 141, Issue 3, 2004, pp. 293-299.

Abstract of Presentation—Midler, "Microemulsions as drug delivery systems," Mar. 3, 2003, 2 pages, http://www.vetcontact.com/.

Abstract of Presentation—Winkels et al., "Electropolymerization of Thiophene Derivatives and Composite Materials from Microemulsions," 2001 Joint International Meeting—the 200th Meeting of the Electrochemical Society, Inc. and the 52nd Annual Meeting of the International Society of Electrochemistry—San Francisco, California, 2001, 1 page.

Article—Edson et al., "Electrical Properties of a Novel High CV Wet Tantalum Capacitor System," *CARTS USA 2009*, Jacksonviile, Florida, Mar. 30-Apr. 2, 2009, 11 pages.

Article—Harrison, "Microemulsion technology for surfactants," *Speciality Chemicals Magazine*, Nov. 2004, pp. 32-36. www.specchemonline.com.

Article—Naoi et al., "Simultaneous electrochemical formulation of Al$_2$O$_3$/polypyrrole layers (I): effect of electrolyte anion in formation process," *Electrochimica Acta*, vol. 45, Issue 20, 2000, pp. 3413-3421.

Article—Naoi et al., "Simultaneou Formation of Seperate Conducting and Insulating Layers on Aluminum Electrode by Electrolysis," *Electrochemical and Solid-State Letters*, vol. 1, Issue 1, 1998, pp. 34-36.

Article—Tsakova et al., "Anodic polymerization of 3,4-ethylenedioxythiophene from aqueous microemulsions," *Electrochimica Acta*, vol. 46, Issue 5, 2000, pp. 759-768.

Article—Wang et al., "Electrochemical supercapacitor electrode material based on poly(3,4-ethylenedioxythiophene)/polypyrrole composite," *Journal of Power Sources*, vol. 163, Issue 2, 2007, pp. 1120-1125.

Article—Wang, "Research progress on a novel conductive polymer—poly(3,4-ethylenedioxythiophene) (PENDOT)," *Journal of Physics: Conference Series*, vol. 152, Issue 1, 2009, pp. 012023.

Book—Behler et al., *Reations and Synthesis in Surfactant Systems*, Chapter 1: Industrial Surfactant Syntheses, 2001, 44 pages.

Related Applicant Form.

* cited by examiner

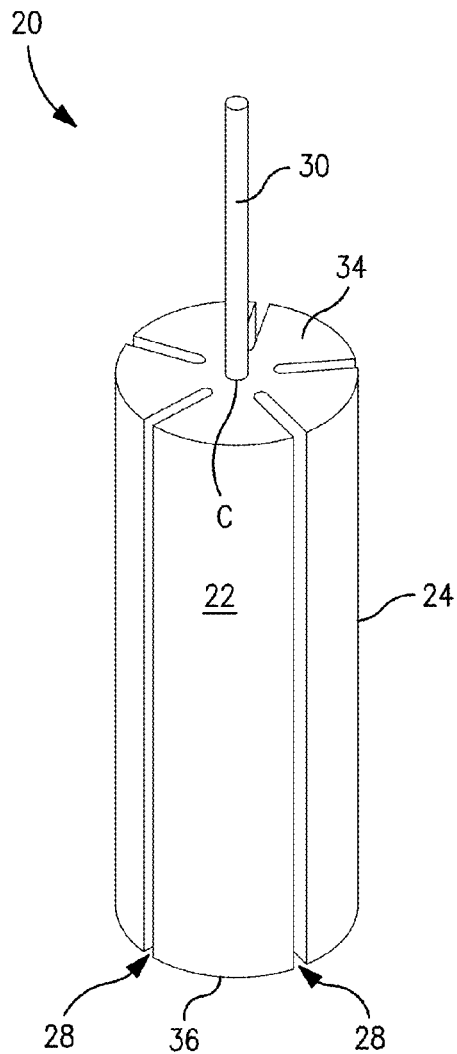
FIG. 2
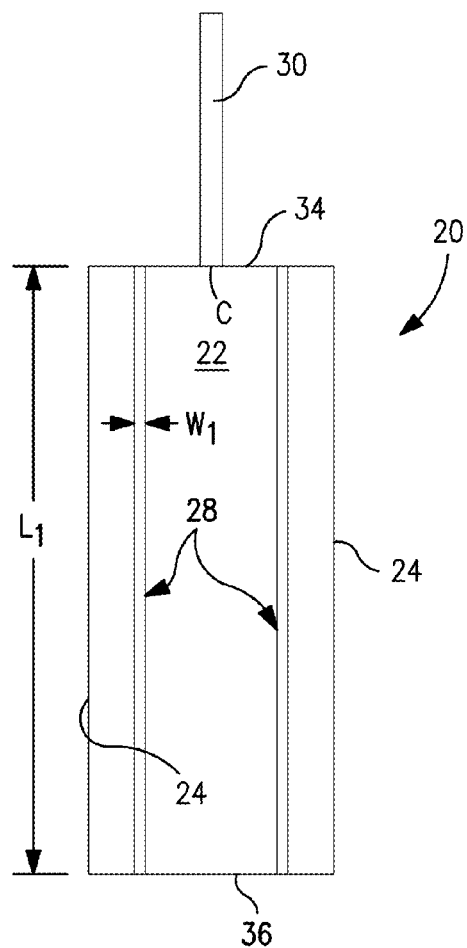
FIG. 3
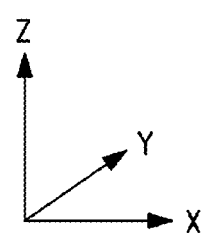

US 9,183,991 B2

ELECTRO-POLYMERIZED COATING FOR A WET ELECTROLYTIC CAPACITOR

BACKGROUND OF THE INVENTION

Electrolytic capacitors typically have a larger capacitance per unit volume than certain other types of capacitors, making them valuable in relatively high-current and low-frequency electrical circuits. One type of capacitor that has been developed is a "wet" electrolytic capacitor that includes a sintered tantalum powder anode. These tantalum slugs first undergo an electrochemical oxidation that forms an oxide layer coating acting as dielectric over the entire external and internal surfaces of the tantalum body. The anodized tantalum slugs may then be sealed within a metal casing (e.g., tantalum) containing a liquid electrolyte solution. To enhance capacitance, a finely divided conductive material is often applied to the metal casing that is formed from activated carbon or ruthenium oxide. Unfortunately, however, such coatings are expensive and can also become easily detached under certain conditions. As such, a need still exists for an improved wet electrolytic capacitor.

SUMMARY OF THE INVENTION

In accordance with one embodiment of the present invention, a wet electrolytic capacitor is disclosed that comprises an anode formed from an anodically oxidized sintered porous body, a fluidic working electrolyte, and a casing within which the anode and working electrolyte are positioned. The casing contains a conductive coating disposed on a surface of a metal substrate. The coating contains a discontinuous precoat layer that contains a plurality of discrete projections of a conductive material deposited over the surface of the metal substrate in a spaced-apart fashion so that the projections cover from about 5% to about 80% of the surface of the metal substrate. The coating also contains a conductive polymer layer that overlies the discontinuous precoat layer, wherein the conductive polymer layer is formed by electrolytic polymerization of a colloidal suspension that includes a precursor monomer.

In accordance with another embodiment of the present invention, a method for forming a casing of a wet electrolytic capacitor is disclosed. The method comprises forming a discontinuous precoat layer on a surface of a metal substrate, the precoat layer containing a plurality of discrete projections of a conductive material deposited over the surface of the metal substrate in a spaced-apart fashion so that the projections cover from about 5% to about 80% of the surface of the metal substrate. A colloidal suspension is applied to the metal substrate that comprises a precursor monomer. An electrode is placed in contact with the metal substrate, and a current feed is supplied to the electrode to induce electrolysis and oxidative polymerization of the precursor monomer, thereby forming a conductive polymer layer that overlies the precoat layer.

Other features and aspects of the present invention are described in more detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 2 is a perspective view of one embodiment of an anode that may be employed in the wet electrolytic capacitor;

FIG. 3 is a side view of the anode of FIG. 2;

Figure 1:
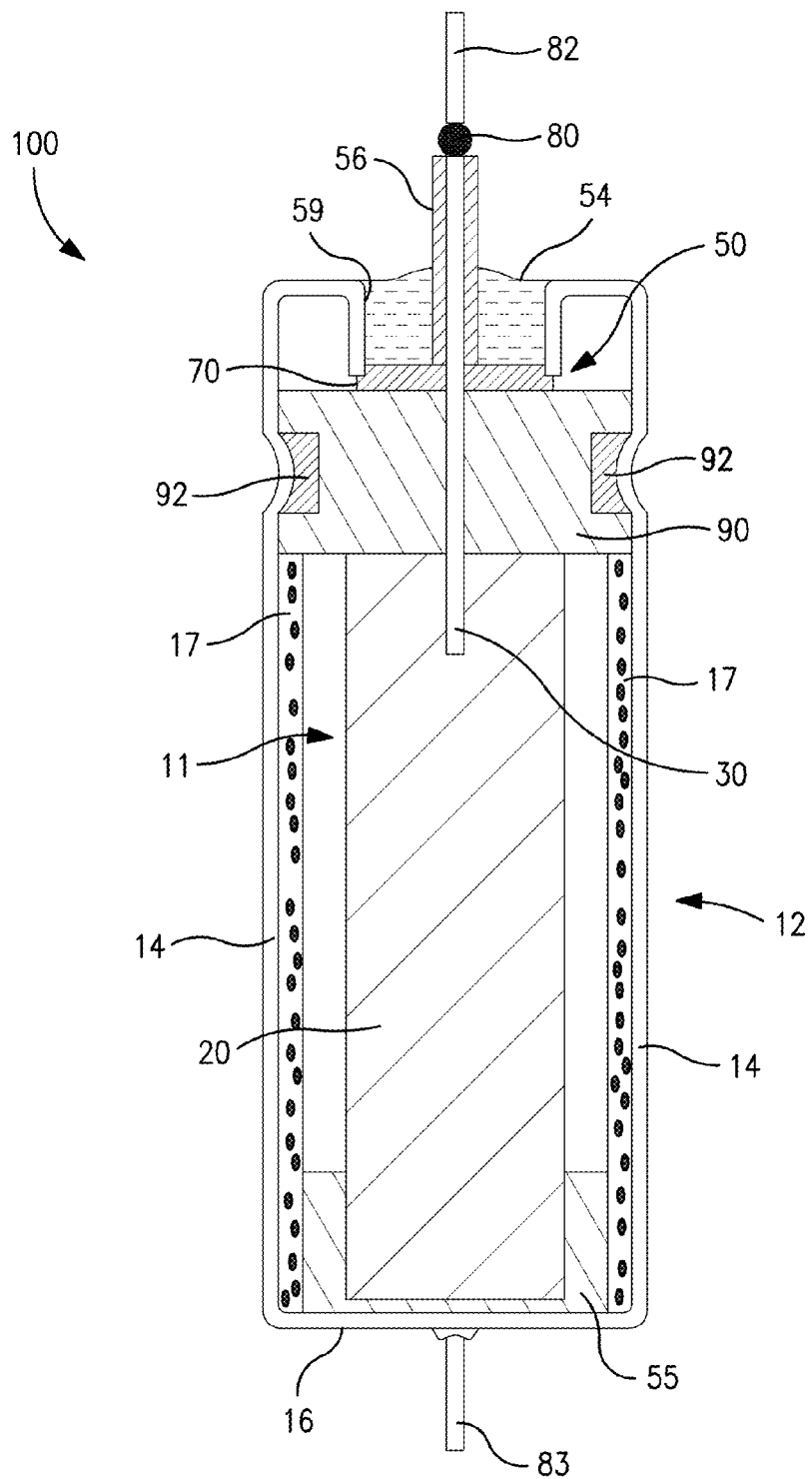
FIG. 1 is a schematic view of one embodiment of the wet electrolytic capacitor of the present invention.

Repeat use of reference characters in the present specification and drawing is intended to represent the same or analogous features or elements of the present invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention.

Generally speaking, the present invention is directed to a wet electrolytic capacitor that contains a casing within which is positioned an anode formed from an anodically oxidized sintered porous body and a fluidic working electrolyte. The casing contains a metal substrate coated with a conductive coating. The degree of surface contact between the conductive coating and the surface of the metal substrate is enhanced in the present invention by selectively controlling the manner in which the coating is formed. More particularly, the conductive coating contains a conductive polymer layer formed through anodic electrochemical polymerization ("electro-polymerization") of a colloidal suspension on the surface of the metal substrate. The use of a colloidal suspension can improve the degree of surface coverage and overall conductivity of the coating, and allow oligomeric chains to grow immediately adjacent to the surface of the metal substrate, which can increase robustness and mechanical stability.

To even further enhance the ability of the conductive polymer layer to remain adhered to the metal substrate, the conductive coating also contains a precoat layer that is discontinuous in nature and contains a plurality of discrete projections of a conductive material that are deposited over the surface of the metal substrate in a spaced-apart fashion so that they form "island-like" structures. These discrete projections can effectively roughen the surface of the metal substrate, thereby improving the ability of the conductive polymer layer to be adhered thereto. Due to its discontinuous nature, a substantial portion of the conductive polymer layer may also directly contact the metal substrate, which can reduce ESR and improve capacitance. In this regard, the surface coverage of the projections on the metal substrate may also be selectively controlled to help achieve the desired electrical performance. For example, the surface coverage of the projections is typically from about 5% to about 80%, in some embodiments from about 10% to about 70%, and in some embodiments, from about 15% to about 60%. The average size of the projections may likewise be from about 50 nanometers to about 500 micrometers, in some embodiments from about 1 to about 250 micrometers, and in some embodiments, from about 5 to about 100 micrometers.

Various embodiments of the present invention will now be described in further detail.

I. Casing

A. Metal Substrate

The metal substrate may serve as a cathode for the capacitor and may be formed from a variety of different metals, such as tantalum, niobium, aluminum, nickel, hafnium, titanium, copper, silver, steel (e.g., stainless), alloys thereof, composites thereof (e.g., metal coated with electrically conductive oxide), and so forth. Tantalum is particularly suitable for use in the present invention. The geometric configuration of the substrate may generally vary as is well known to those skilled in the art, such as in the form of a foil, sheet, screen, container, can, etc. The metal substrate may form the all or a portion of casing for the capacitor, or it may simply be applied to the casing. Regardless, the substrate may have a variety of shapes, such as generally cylindrical, D-shaped, rectangular, triangular, prismatic, etc. If desired, a surface of the substrate may be roughened to increase its surface area and increase the degree to which a material may be able to adhere thereto. In one embodiment, for example, a surface of the substrate is chemically etched, such as by applying a solution of a corrosive substance (e.g., hydrochloric acid) to the surface. Mechanical roughening may also be employed. For instance, a surface of the substrate may be abrasive blasted by propelling a stream of abrasive media (e.g., sand) against at least a portion of a surface thereof.

If desired, a dielectric layer may be formed on the metal substrate prior to application of the conductive coating such that it is positioned between the substrate and the coating. The thickness of the dielectric layer may be controlled within a certain range, such as from about 10 nanometers to about 500 nanometers, in some embodiments from about 15 nanometers to about 200 nanometers, in some embodiments from about 20 nanometers to about 100 nanometers, and some embodiments, from about 30 nanometers to about 80 nanometers. Within intending to be limited by theory, it is believed that acids often present in the working electrolyte can undergo secondary reactions with the metal substrate (e.g., tantalum) at relatively high temperatures. The presence of a relatively thick dielectric layer can therefore help to passivate the metal substrate, and thereby minimize the likelihood that the working electrolyte will react with the substrate to reduce its conductivity and increase ESR. By ensuring that the thickness is controlled within the ranges noted above, however, the conductivity of the casing is not reduced to such an extent that the electrical properties of the capacitor are adversely impacted.

A surface of the metal substrate (e.g., interior surface) may be subjected to a voltage to initiate anodic formation ("anodization") of an oxide film (dielectric layer) as described above. For example, a tantalum (Ta) substrate may be anodized to form a dielectric layer of tantalum pentoxide ($Ta_2O_5$). Anodization may be performed by initially applying an electrolyte to the metal substrate, such as by dipping the substrate into a bath that contains the electrolyte, and then applying a current. The electrolyte is generally in the form of a liquid, such as a solution (e.g., aqueous or non-aqueous), dispersion, melt, etc. A solvent is generally employed in the electrolyte, such as water (e.g., deionized water); ethers (e.g., diethyl ether and tetrahydrofuran); alcohols (e.g., methanol, ethanol, n-propanol, isopropanol, and butanol); triglycerides; ketones (e.g., acetone, methyl ethyl ketone, and methyl isobutyl ketone); esters (e.g., ethyl acetate, butyl acetate, diethylene glycol ether acetate, and methoxypropyl acetate); amides (e.g., dimethylformamide, dimethylacetamide, dimethylcaprylic/capric fatty acid amide and N-alkylpyrrolidones); nitriles (e.g., acetonitrile, propionitrile, butyronitrile and benzonitrile); sulfoxides or sulfones (e.g., dimethyl sulfoxide (DMSO) and sulfolane); and so forth. The solvent may constitute from about 50 wt. % to about 99.9 wt. %, in some embodiments from about 75 wt. % to about 99 wt. %, and in some embodiments, from about 80 wt. % to about 95 wt. % of the electrolyte. Although not necessarily required, the use of an aqueous solvent (e.g., water) is often desired to facilitate formation of an oxide. In fact, water may constitute about 1 wt. % or more, in some embodiments about 10 wt. % or more, in some embodiments about 50 wt. % or more, in some embodiments about 70 wt. % or more, and in some embodiments, about 90 wt. % to 100 wt. % of the solvent(s) used in the electrolyte.

The electrolyte is electrically conductive and may have an electrical conductivity of about 1 milliSiemens per centimeter ("mS/cm") or more, in some embodiments about 30 mS/cm or more, and in some embodiments, from about 40 mS/cm to about 100 mS/cm, determined at a temperature of 25° C. To enhance the electrical conductivity of the electrolyte, a compound may be employed that is capable of dissociating in the solvent to form ions. Suitable ionic compounds for this purpose may include, for instance, acids, such as hydrochloric acid, nitric acid, sulfuric acid, phosphoric acid, polyphosphoric acid, boric acid, boronic acid, etc.; organic acids, including carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid, citric acid, formic acid, acetic acid, glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; sulfonic acids, such as methanesulfonic acid, benzenesulfonic acid, toluenesulfonic acid, trifluoromethanesulfonic acid, styrenesulfonic acid, naphthalene disulfonic acid, hydroxybenzenesulfonic acid, dodecylsulfonic acid, dodecylbenzenesulfonic acid, etc.; polymeric acids, such as poly(acrylic) or poly(methacrylic) acid and copolymers thereof (e.g., maleic-acrylic, sulfonic-acrylic, and styrene-acrylic copolymers), carageenic acid, carboxymethyl cellulose, alginic acid, etc.; and so forth. The concentration of ionic compounds is selected to achieve the desired electrical conductivity. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the electrolyte. If desired, blends of ionic compounds may also be employed in the electrolyte.

A current is passed through the electrolyte to form the dielectric layer. The value of voltage manages the charge (current multiplied by time) and thereby the thickness of the dielectric layer. For example, the power supply may be initially set up at a galvanostatic mode until the required voltage is reached. Thereafter, the power supply may be switched to a potentiostatic mode in which the voltage is held constant to ensure that the desired dielectric thickness is formed over the surface of the metal substrate. Of course, other known methods may also be employed, such as pulse methods. Regardless, to help achieve the desired thickness for the dielectric layer as noted above, the forming voltage used during anodization, which is typically equal to the peak voltage, is typically high, such as about 5 volts or more, in some embodiments about 7 volts or more, in some embodiments from about 10 volts to about 25 volts, and in some embodiments, from about 12 to about 22 volts. The voltage level may vary (e.g., increasing) or remain constant within this range. The temperature of the anodizing solution may range from about 10° C. to about 200° C., in some embodiments from about 20° C. to about 150° C., and in some embodiments, from about 30° C. to about 100° C. The resulting dielectric layer may thus be formed on the surface of the metal substrate as described above.

B. Conductive Coating

The conductive coating is disposed on a surface of the metal substrate (e.g., interior surface) to serve as an electrochemically active material for the capacitor and includes a precoat layer and conductive polymer layer. Any number of layers may be employed in the coating. For example, the coating may contain one or multiple precoat layers and one or multiple conductive polymer layers. Other layers may also be employed in the coating if so desired. While the particular arrangement of the individual layers may vary, it is typically desired that at least one precoat layer overlies the metal substrate, and that at least one conductive polymer layer overlies the precoat layer so that the precoat layer is positioned between the conductive polymer layer and the metal substrate.

i. Precoat Layer

Any of a variety of different materials may generally be employed in the present invention to form the discontinuous precoat layer. For example, a particulate material may be employed that includes conductive particles, such as those formed from ruthenium, iridium, nickel, rhodium, rhenium, cobalt, tungsten, manganese, tantalum, niobium, molybdenum, lead, titanium, platinum, palladium, and osmium, as well as combinations of these metals. Non-insulating oxide conductive particles may also be employed. Suitable oxides may include a metal selected from the group consisting of ruthenium, iridium, nickel, rhodium, rhenium, cobalt, tungsten, manganese, tantalum, niobium, molybdenum, lead, titanium, platinum, palladium, and osmium, as well as combinations of these metals. Particularly suitable metal oxides include ruthenium dioxide, niobium oxide, niobium dioxide, iridium oxide, and manganese dioxide. Carbonaceous particles may also be employed that have the desired level of conductivity, such as activated carbon, carbon black, graphite, etc. Some suitable forms of activated carbon and techniques for formation thereof are described in U.S. Pat. No. 5,726,118 to Ivey, et al. and U.S. Pat. No. 5,858,911 to Wellen, et al.

In particularly suitable embodiments, the precoat layer may be formed from a noble metal that can further enhance the electrical performance of the capacitor by helping to minimize electrochemical reactions between components of the coating and the fluid electrolyte, which might otherwise generate reactive hydrogen radicals that lead to embrittlement of the metal substrate and a degradation in performance (e.g., increase equivalence series resistance ("ESR"), decrease capacitance, etc.). More particularly, the present inventors believe that the noble metal can act as a catalyst to drive electrochemical reactions towards the formation of hydrogen gas, which is less reactive than hydrogen radicals and thus less detrimental to capacitor performance.

Suitable noble metals may include ruthenium, rhodium, palladium, silver, osmium, iridium, platinum, and gold. Noble metals of the platinum family are particularly suitable for use in the present invention, such as ruthenium, rhodium, palladium, osmium, iridium, and platinum. Any of a variety of known techniques may generally be employed to apply a noble metal precoat layer to the metal substrate. Suitable methods may include, for instance, electrolytic plating, vapor deposition, electroless plating, etc., such as described in U.S. Pat. No. 4,780,797 to Libby and U.S. Pat. No. 3,628,103 to Booe. As is known in the art, for example, electroless plating may rely upon the presence of a reducing agent (e.g., hydrated sodium hypophosphite) that can react with noble metal ions to deposit a noble metal onto a surface of the metal substrate. The noble metal ion may be provided in the form of a salt, such as a noble metal chloride (e.g., palladium chloride), bromide, cyanide, fluoride, iodide, oxide hydrate, selenite, sulfate, etc. The salt and reducing agent may be applied in a plating solution whose pH can be controlled as is known in the art to optimize metal deposition. Upon application, the noble metal may also be subjected to an optional heat treatment to help it to better bond with the metal substrate. While the exact temperature of heat treatment may vary depending on the noble metal employed, it is typically high enough to allow bonding between the noble metal and surface of the metal substrate, but not so high that it might cause appreciable loss of material through vaporization. For instance, a suitable temperature range for bonding palladium to a tantalum substrate may be from about 800° C. to about 1700° C., in some embodiments from about 850° C. to about 1600° C., and in some embodiments, from about 900° C. to about 1200° C. If desired, heat treatment may occur under vacuum or in the presence of an inert gas (e.g., argon, nitrogen, etc.) to inhibit the oxidation of the metal substrate.

ii. Conductive Polymer Layer

As noted, the conductive coating of the present invention also contains a conductive polymer layer. Although a portion of the conductive polymer layer may be in direct contact with the metal substrate as described above, it is nevertheless considered to overlie the precoat layer to the extent that the precoat layer is positioned between at least a portion of the conductive polymer layer and the metal substrate.

The conductive polymer layer is formed by anodic electrochemical polymerization of a colloidal suspension containing a precursor monomer. The colloidal suspension may be in the form of a macroemulsion, microemulsion, solution, etc. depending on the particular nature of the components of the suspension. Regardless, the suspension generally contains a solvent that serves as a continuous phase within which the precursor monomer is dispersed. Any of a variety of different solvents may be employed in the colloidal suspension, such as alcohols, glycols, water, etc. In one particular embodiment, the colloidal suspension is aqueous in nature. Solvents (e.g., water) may constitute from about 50 wt. % to about 99 wt. %, in some embodiments from about 70 wt. % to about 98 wt. % and in some embodiments, from about 80 wt. % to about 95 wt. %. The remaining components of the colloidal suspension (e.g., precursor monomers, surfactants, and sulfonic acids) may likewise constitute from about 1 wt. % to about 50 wt. %, in some embodiments from about 2 wt. % to about 30 wt. % and in some embodiments, from about 5 wt. % to about 20 wt. % of the colloidal suspension.

Any of a variety of precursor monomers may be employed in the colloidal suspension that are capable of being polymerized to form a conductive polymer layer. Specific examples of such monomers include, for instance, pyrroles (e.g., pyrrole, alkylpyrroles, etc.), thiophenes (e.g., 3,4-ethylenedioxythiophene), anilines (e.g., alkylanilines, such as methylaniline, and alkoxyanilines, such as methoxyaniline), as well as derivatives and combinations thereof. A single monomer may be employed to form a homopolymer, or two or more monomers may be employed to form a copolymer. In one particular embodiment, for example, a thiophene derivative monomer may be employed that has the following general structure:

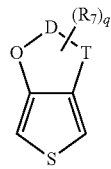

wherein,

T is O or S;

D is an optionally substituted $C_1$ to $C_5$ alkylene radical (e.g., methylene, ethylene, n-propylene, n-butylene, n-pentylene, etc.);

$R_7$ is independently selected from a linear or branched, optionally substituted $C_1$ to $C_{18}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); optionally substituted $C_5$ to $C_{12}$ cycloalkyl radical (e.g., cyclopentyl, cyclohexyl, cycloheptyl, cyclooctyl, cyclononyl cyclodecyl, etc.); optionally substituted $C_6$ to $C_{14}$ aryl radical (e.g., phenyl, naphthyl, etc.); optionally substituted $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); optionally substituted $C_1$ to $C_4$ hydroxyalkyl radical, or hydroxyl radical; and q is an integer from 0 to 8, in some embodiments, from 0 to 2, and in one embodiment, 0. It should be understood that the $R_7$ group(s) may be bonded to one or more of the carbon atoms of the ring system.

Examples of substituents for the radicals "D" or "$R_7$" include, for instance, hydroxyl, alkyl, cycloalkyl, aryl, aralkyl, alkoxy, halogen, ether, thioether, disulphide, sulfoxide, sulfone, sulfonate, amino, aldehyde, keto, carboxylic acid ester, carboxylic acid, carbonate, carboxylate, cyano, alkylsilane and alkoxysilane groups, carboxylamide groups, and so forth. Particularly suitable thiophene monomers are those in which "D" is an optionally substituted $C_2$ to $C_3$ alkylene radical. For instance, optionally substituted 3,4-alkylenedioxythiophenes may be employed that have the general structure:

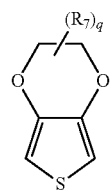

wherein, $R_7$ and q are as defined above. In one particular embodiment, "q" is 0 such that the monomer is 3,4-ethylenedioxythiophene. One commercially suitable example of 3,4-ethylenedioxthiophene is available from Heraeus Clevios under the designation Clevios™ M. Of course, as noted above, derivatives of 3,4-ethylenedioxythiophene may also be employed. The derivatives may be made up of identical or different monomer units and used in pure form and in a mixture with one another and/or with the monomers. For instance, suitable derivatives of 3,4-ethylenedioxythiophene include those having the following general structure:

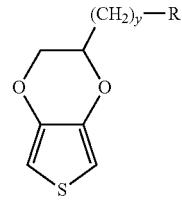

where, y is from 1 to 10, in some embodiments from 1 to 5, in some embodiments, from 1 to 3, and in some embodiments, from 1 to 2 (e.g., 2); and R is a linear or branched, optionally substituted $C_1$ to $C_{18}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); optionally substituted $C_5$ to $C_{12}$ cycloalkyl radical (e.g., cyclopentyl, cyclohexyl, cycloheptyl, cyclooctyl, cyclononyl cyclodecyl, etc.); optionally substituted $C_6$ to $C_{14}$ aryl radical (e.g., phenyl, naphthyl, etc.); optionally substituted $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); optionally substituted $C_1$ to $C_4$ hydroxyalkyl radical; hydroxyl radical; or a combination thereof. Examples of substituents for the radicals "R" include, for instance, hydroxyl, alkyl, cycloalkyl, aryl, aralkyl, alkoxy, halogen, ether, thioether, disulphide, sulfoxide, sulfone, sulfonate, amino, aldehyde, keto, carboxylic acid ester, carboxylic acid, carbonate, carboxylate, cyano, alkylsilane and alkoxysilane groups, carboxylamide groups, and so forth. Particular examples of such polymers include hydroxyethylated poly(3,4-ethylenedioxythiophene) (y is 2 and R is OH) is and hydroxymethylated poly(3,4-ethylenedioxthiophene) (y is 1 and R is OH). It should be understood that other "R" group(s) may also be bonded to one or more other the carbon atoms of the ring system.

Suitable pyrrole monomers may likewise include those having the following general structure:

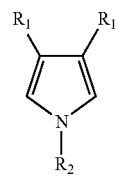

wherein, $R_1$ is independently selected from hydrogen, alkyl, alkenyl, alkoxy, alkanoyl, alkylthio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, acrylic acid, phosphoric acid, phosphonic acid, halogen, nitro, cyano, hydroxyl, epoxy, silane, siloxane, alcohol, benzyl, carboxylate, ether, amidosulfonate, ether carboxylate, ether sulfonate, ester sulfonate, and urethane; or both $R_1$ groups together may form an alkylene or alkenylene chain completing a 3, 4, 5, 6, or 7-membered aromatic or alicyclic ring, which ring may optionally include one or more divalent nitrogen, sulfur or oxygen atoms; and $R_2$ is hydrogen, alkyl, alkenyl, aryl, alkanoyl, alkylthioalkyl, alkylaryl, arylalkyl, amino, epoxy, silane, siloxane, alcohol, benzyl, carboxylate, ether, ether carboxylate, ether sulfonate, ester sulfonate, and urethane. In one particular embodiment, both $R_1$ and $R_2$ are hydrogen. Other suitable pyrroles may include 3-alkylpyrroles, such as 3-hexylpyrrole; 3,4-dialkylpyrroles, such as 3,4-dihexylpyrrole; 3-alkoxypyrroles, such as 3-methoxypyrrole; and 3,4-dialkoxypyrroles, such as 3,4-dimethoxypyrrole.

The total concentration of monomers employed in the colloidal suspension may vary, but is typically from about 0.1 wt. % to about 15 wt. %, in some embodiments from about 0.4 wt. % to about 10 wt. %, and in some embodiments, from about 0.5 wt. % to about 5 wt. % by weight of the colloidal suspension.

A surfactant may also be employed in the colloidal suspension to form micelles that lead to an increase in solubility, forming a macroscopically or microscopically homogenous distribution of these micelles and the precursor monomer. The surfactant may be ionic (e.g., anionic, cationic, or zwitterionic) or nonionic in nature. The ionic surfactant may, for instance, be an anionic surfactant, such as a sulfonate (e.g., alkyl arylene sulfonates, α-olefin sulfonates, β-alkoxy alkane sulfonates, alkylauryl sulfonates, alkyl monoglyceride sulfonates, alkyl ether sulfonates, etc.); sulfate (e.g., alkyl sulfates, alkyl aryl sulfates, alkyl ether sulfates, alkyl monoglyceride sulfates, etc.); sulfosuccinate; sarcosinate; etc., as well as derivatives, salts, polymers, and/or mixtures of the foregoing. Particular examples of ionic surfactants include, but are not limited to, $C_8$-$C_{30}$ alkyl sulfates, $C_8$-$C_{30}$ alkyl ether sulfates having one or two moles of ethoxylation, $C_8$-$C_{30}$ alkoyl sarcosinates, $C_8$-$C_{30}$ sulfoacetates, $C_8$-$C_{30}$ sulfosuccinates, $C_8$-$C_{30}$ alkyl diphenyl oxide disulfonates, $C_8$-$C_{30}$ alkyl carbonates, $C_8$-$C_{30}$ arylene sulfonates, etc. The $C_8$-$C_{30}$ alkyl group may be straight chain (e.g., dodecyl) or branched (e.g., 2-ethylhexyl). The cation of the ionic surfactant may be a proton, alkali metal (e.g., sodium or potassium), ammonium, $C_1$-$C_4$ alkylammonium (e.g., mono-, di-, tri-), or $C_1$-$C_3$ alkanolammonium (e.g., mono-, di-, tri). In one particular embodiment, for example, the anionic surfactant may be an alkyl benzenesulfonate having the following general structure:

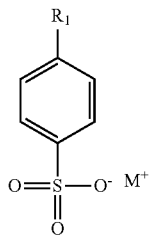

wherein,
$R_1$ is an alkyl group having from 8 to 30 carbon atoms, in some embodiments from 9 to 20, and in some embodiments, from 10 to 14 (e.g., 12) carbon atoms; and M is cation, such as hydrogen, a metal (e.g., sodium, potassium, lithium, etc.), ammonia ($NH_4^+$), etc. Comparable compounds with a naphthalene nucleus also can be used to form alkyl naphthalenesulfonates. Without intending to be limited by theory, it is believed that such alkyl arylene sulfonates are particularly effective in enhancing the surface coverage of the colloidal suspension on the substrate while also facilitating charge transport.

Of course, in addition to or in lieu of an anionic surfactant, cationic surfactants and/or zwitterionic surfactants may also be employed. Examples of cationic surfactants may include amino acids, alkyl amine salts, quaternary ammonium salts, pyridium salts, etc. For instance, suitable alkyl amine salts may include salts of primary or secondary amines having 3 to 22 carbon atoms, and carboxylic acid having 1 to 22 carbon atoms or inorganic mineral acid, such as dodecylamine acetate salt, dodecylamine hydrochloride salt, dodecylamine stearate salt, dodecylamine sulfonate, dimethylamine stearate salt, etc. In certain embodiments, such cationic surfactants may be formed in situ within the colloidal suspension through the addition of an amine (e.g., dodecylamine) and an acid, such as a sulfonic acid described below (e.g., toluene sulfonic acid).

Nonionic surfactants may also be employed. Such surfactants typically have a hydrophobic base, such as a long chain alkyl group or an alkylated aryl group, and a hydrophilic chain containing a certain number (e.g., 1 to about 30) of ethoxy and/or propoxy moieties. Although not necessarily required, nonionic surfactants having a certain hydrophilic/lipophilic balance ("HLB") value may help improve the stability of the colloidal suspension. The HLB index is well known in the art and is a scale that measures the balance between the hydrophilic and lipophilic solution tendencies of a compound with lower numbers representing highly lipophilic tendencies and the higher numbers representing highly hydrophilic tendencies. In some embodiments of the present invention, the HLB value of the nonionic surfactant is from about 5 to about 20, in some embodiments from about 10 to about 19 and in some embodiments, from about 11 to about 18. If desired, two or more surfactants may be employed that have HLB values either below or above the desired value, but together have an average HLB value within the desired range.

Suitable nonionic surfactants may include, for instance, polyoxyethylene chains as hydrophilic groups, polyglycerol fatty acid esters, polyglycerol fatty alcohol ethers, sucrose fatty acid esters, and hydrocarbyl polyglycosides. In one embodiment, the nonionic surfactant includes polyoxyethylene chains as hydrophilic groups and is selected from the group of polyoxyethylene fatty acid esters, polyoxyethylene fatty alcohol ethers, polyoxyethylene sorbitol anhydride fatty acid esters, polyoxyethylene glycerol mono fatty acid esters, polyoxyethylene hydrogenated castor oil and polyoxyethylene hydrogenated castor oil mono fatty acid esters, etc., as well as combinations thereof. Particularly suitable are polyoxyethylene fatty alcohol ethers in which the fatty alcohol forming the polyoxyethylene fatty alcohol ether is saturated or unsaturated, and has 8 to 22 carbon atoms (e.g., 8 to 14), and the polyoxyethylene structure moiety contains on average 4 to 60 ethylene oxide repeating units (e.g., 4 to 12). Examples of such surfactants include polyoxyethylene octyl ethers (e.g., polyoxyethylene-5 octyl ether), polyoxyethylene decyl ethers, polyoxyethylene lauryl ethers (e.g., polyoxyethylene-8 lauryl ether or polyoxyethylene-10-lauryl ether), polyoxyethylene myristyl ethers, polyoxyethylene palmityl ethers, polyoxyethylene isostearyl ethers, polyoxyethylene stearyl ethers, polyoxyethylene oleyl ethers, polyoxyethylene behenyl ethers, etc.

Regardless of its particular form, the surfactant can facilitate the formation of a colloidal suspension of precursor monomer droplets. Without intending to be limited by theory, it is believed that such droplets can result in the formation of relatively small polymer units on the surface of the cathode substrate during anodic electrochemical polymerization. Such smaller polymer units can, in turn, result in a coating that is substantially uniform with excellent surface coverage. The size of the droplets depends in part on the nature of the suspension. "Microemulsions", for instance, may contains droplets having an average diameter of about 5 micrometers or less, in some embodiments about 4 micrometers or less, in some embodiments from about 10 nanometers to about 2 micrometers, and in some embodiments, from about 20 nanometers to about 1 micrometer.

"Macroemulsions" may likewise contain droplets having a size of from about 5 to about 100 micrometers, and in some embodiments, from about 10 to about 80 micrometers. The term "diameter" can refer to the "hydrodynamic equivalent diameter" of a particle as determined using known techniques, such as photon correlation spectroscopy, dynamic light scattering, quasi-elastic light scattering, etc. These methods are generally based on the correlation of particle size with diffusion properties of particles obtained from Brownian motion measurements. Brownian motion is the random movement of the particles due to bombardment by the solvent molecules that surround the particles. The larger the particle, the more slowly the Brownian motion will be. Velocity is defined by the translational diffusion coefficient. The measured particle size value thus relates to how the particle moves within a liquid and is termed the "hydrodynamic diameter." Various particle size analyzers may be employed to measure the diameter in this manner. One particular example is a Cordouan VASCO 3 Particle Size Analyzer.

To help achieve the desired improvement in the surface coverage of the precursor monomer, it is also generally desired that the concentration of the surfactant is selectively controlled within a certain range relative to the precursor monomer. For example, the ratio of the weight of surfactants to the weight of precursor monomers within the colloidal suspension may be from about 0.5 to about 1.5, in some embodiments from about 0.6 to about 1.4, and in some embodiments, from about 0.8 to about 1.2. Surfactants may, for instance, constitute from about 0.2 wt. % to about 10 wt. %, in some embodiments from about 0.5 wt. % to about 8 wt. %, and in some embodiments, from about 1 wt. % to about 5 wt. % of the colloidal suspension. The total concentration of monomers employed in the colloidal suspension may also be from about 0.1 wt. % to about 15 wt. %, in some embodiments from about 0.4 wt. % to about 10 wt. %, and in some embodiments, from about 0.5 wt. % to about 5 wt. % by weight of the colloidal suspension.

The colloidal suspension may also contain a sulfonic acid that can act as a secondary dopant to provide excess charge to the conductive polymer and stabilize its conductivity. Such acids may, for example, result in a colloidal suspension that has an electrical conductivity of from about 1 to about 100 milliSiemens per centimeter ("mS/cm"), in some embodiments from about 5 to about 60 mS/cm, and in some embodiments, from about 15 to about 50 mS/cm, determined at a temperature of 23° C. using any known electric conductivity meter (e.g., Oakton Con Series 11). The nature of the sulfonic acid, as wells as its relative concentration, may also be selectively controlled so that the pH level of the colloidal suspension is within a range of from about 2.0 to about 8.5, in some embodiments from about 3.0 to about 8.0, and in some embodiments, from about 5.0 to about 7.5. For example, the ratio of the weight of sulfonic acids to the weight of precursor monomers within the colloidal suspension is from about 0.2 to about 1.2, in some embodiments from about 0.4 to about 1.1, and in some embodiments, from about 0.6 to about 1.0. Likewise, the ratio of the weight of sulfonic acids to the weight of surfactants within the colloidal suspension is from about 0.2 to about 1.2, in some embodiments from about 0.3 to about 0.9, and in some embodiments, from about 0.4 to about 0.8.

The sulfonic acid is typically a low molecular weight organic-based monosulfonic acid, disulfonic acid, or trisulfonic acid. Specific examples of such acids include, for instance, alkylsulfonic acids (e.g., 2-acrylamide-2-methyl-propanesulfonic acid, etc.); arylene sulfonic acids, such as benzenesulfonic acids (e.g., phenolsulfonic acid, styrenesulfonic acid, p-toluenesulfonic acid, dodecylbenzenesulfonic acid, etc.) and naphthalenesulfonic acids (e.g., 1-naphthalenesulfonic acid, 2-naphthalenesulfonic acid, 1,3-naphthalenedisulfonic acid, 1,3,6-naphthalenetrisulfonic acid, 6-ethyl-1-naphthalenesulfonic acid, etc.); anthraquinonesulfonic acids (e.g., anthraquinone-1-sulfonic acid, anthraquinone-2-sulfonic acid, anthraquinone-2,6-disulfonic acid, 2-methylanthraquinone-6-sulfonic acid, etc.); camphorsulfonic acids, as well as derivatives and mixtures thereof. Arylene sulfonic acids are particularly suitable for use in the colloidal suspension, such as 1-naphthalenesulfonic acid, 2-naphthalenesulfonic acid, and/or p-toluenesulfonic acid.

It should be understood that the term "sulfonic acid" as used herein also encompass salts of acids, such as those noted above, which can dissociate in an aqueous solution, such as sodium salts, lithium salts, potassium salts, etc. In one embodiment, for example, the sulfonic acid may be a sodium or potassium salt of 1-naphthalenesulfonic acid, 2-naphthalenesulfonic acid, and/or p-toluenesulfonic acid.

In addition to the components noted above, the colloidal suspension may also contain various other additives. For example, a defoaming agent may be employed in certain embodiments to reduce the degree of foam produced by the surfactant during the anodic electrochemical polymerization. Suitable defoaming agents may include, for instance, oils, esters, ethers, glycols, polysiloxanes, long chain oxygenated hydrocarbons (e.g., $C_6$ to $C_{12}$ alcohols), etc., as well as mixtures thereof. Particularly suitable defoaming agents are long chain oxygenated hydrocarbons, such as octanol, decanol and polyethylene glycols. When employed, such defoaming agents may constitute from about 0.01 wt. % to about 5 wt. %, in some embodiments from about 0.05 wt. % to about 4 wt. %, and in some embodiments, from about 0.1 wt. % to about 2 wt. % of the colloidal suspension. Besides defoaming agents, a wide variety of other additives may also be employed in the colloidal suspension.

To apply the colloidal suspension to the metal substrate, any of a variety of suitable application techniques may be employed, such as screen-printing, dipping, electrophoretic coating, spraying, etc. Regardless of how it is applied, the monomer within the colloidal suspension is anodically electrochemically-polymerized to form a conductive polymer layer on the surface of the metal substrate. In one embodiment, for example, the metal substrate is dipped into a bath containing the colloidal suspension of the present invention. A pair of electrodes may be disposed within the bath for electrolysis. One electrode may be connected to the positive terminal of a power source and also in contact with the metal substrate. The other electrode may be connected to the negative terminal of the power source and an additional inert metal. During operation, the power source supplies a current feed to the electrodes in the electrochemical cell, thereby inducing electrolysis of the electrolyte and oxidative polymerization of the monomer in the colloidal suspension onto the metal substrate. Anodic electrochemical polymerization is generally performed at ambient temperature to ensure that the colloidal suspension does not phase separate. For example, the colloidal suspension may be kept at a temperature of from about 15° C. to about 80° C., in some embodiments from about 20° C. to about 75° C., and in some embodiments, from about 25° C. to about 50° C. The amount of time in which the metal substrate is in contact with the colloidal suspension during anodic electrochemical polymerization may vary. For example, the metal substrate may be dipped into such a solution for a period of time ranging from about 10 seconds to about 10 minutes.

The resulting conductive polymer layer includes conductive polymer(s) that are typically π-conjugated chains of aromatic heterocyclic units and have increased electrical conductivity after oxidation. Because the conductive polymer is generally semi-crystalline or amorphous, it can dissipate and/or absorb the heat associated with the high voltage. This in turn prevents fluid electrolyte phase transitions (from liquid to gas) at the interface. The conductive polymer will somewhat swell through absorption of some volume of fluid electrolyte. Examples of such π-conjugated conductive polymers that can be formed in accordance with the present invention include polyheterocycles (e.g., polypyrroles, polythiophenes, polyanilines, etc.), polyacetylenes, poly-p-phenylenes, polyphenolates, and so forth. In one particular embodiment, the substituted polythiophene has the following general structure:

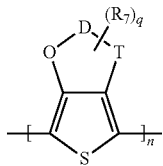

wherein,

T, D, $R_7$, and q are defined above; and n is from 1 to 1,000, in some embodiments from 2 to 500, and in some embodiments, from 4 to 350. Particularly suitable thiophene polymers are those in which "D" is an optionally substituted $C_2$ to $C_3$ alkylene radical. For instance, the polymer may be optionally substituted poly(3,4-ethylenedioxythiophene), which has the following general structure:

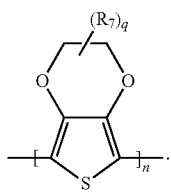

If desired, multiple polymerization steps may be repeated until the desired thickness of the coating is achieved. In such cases, the additional layer(s) may be polymerized using the technique and colloidal suspension of the present invention, or using other methods, such as chemical polymerization. The additional layer(s) (e.g., chemically polymerized layer) may be disposed directly on the pre-coat layer or over the electro-polymerized layer. Regardless, the total target thickness of the conductive polymer layer(s) may generally vary depending on the desired properties of the capacitor. Typically, the resulting conductive polymer layer(s) have a thickness of from about 0.2 micrometers ("μm") to about 50 μm, in some embodiments from about 0.5 μm to about 20 μm, and in some embodiments, from about 1 μm to about 5 μm. It should be understood that the thickness of the layers are not necessarily the same at all locations on the substrate. Nevertheless, the average thickness on the substrate generally falls within the ranges noted above.

iii. Other Layers

If desired, the conductive coating may also contain other types of layers for a variety of different purposes. For example, the conductive coating may contain a hydrogen protection layer, which can further absorb and dissipate hydrogen radicals. In certain embodiments, the precoat layer may overlie the hydrogen protection layer. In such embodiments, the hydrogen protection layer may be positioned between the metal substrate and the precoat layer and also positioned adjacent to the metal substrate.

When employed, the hydrogen protection layer may include a plurality of relatively small, high surface area agglomerates that are sintered together so that they form a more integral and robust coating. Although not necessarily required, the agglomerates may also be sintered to the metal substrate so that the protection layer remains more readily adhered thereto. The shape of the agglomerates may vary, such as spherical, nodular, flake, etc. Typically, the agglomerates are selected to have a high specific charge to help increase the cathode capacitance, such as about 70,000 microFarads*Volts per gram ("μF*V/g") or more, in some embodiments about 80,000 μF*V/g or more, in some embodiments about 90,000 μF*V/g or more, in some embodiments about 100,000 μF*V/g or more, and in some embodiments, about 120,000 to about 350,000 μF*V/g. Examples of valve metal compositions for forming such agglomerates include valve metals, such as tantalum, niobium, aluminum, hafnium, titanium, alloys thereof, etc., as well as oxides thereof (e.g., niobium oxide), nitrides thereof, and so forth. In a preferred embodiment, the composition contains tantalum.

The agglomerates may, for example, have an aggregate D50 size of about 100 micrometers or less, in some embodiments from about 1 to about 80 micrometers, and in some embodiments, from about 10 to about 70 micrometers, wherein the term "D50 size" generally means that at least 50% of the agglomerates having a size within the denoted range as determined by sieve analysis. The particle size distribution of the agglomerates may also be relatively narrow. For example, no more than about 5%, in some embodiments no more than about 2%, and in some embodiments, no more than about 1% of the agglomerates having a size greater than 150 micrometers.

In addition to having a small aggregate size within a controlled range, the primary particle size of the agglomerates may also be relatively small. For example, the average primary particle size of the agglomerates may be from about 5 nanometers to about 20 micrometers, in some embodiments from about 10 nanometers to about 10 micrometers, in some embodiments from about 15 nanometers to about 5 micrometers, and in some embodiments, from about 20 nanometers to about 800 nanometers. The agglomerates may likewise have a relatively high specific surface area, such as about 1.2 $m^2/g$ or more, in some embodiments about 1.5 $m^2/g$ or more, and in some embodiments, from about 2.0 to about 8.0 $m^2/g$. The "specific surface area" may be determined using a variety of techniques known in the art, such as by the physical gas adsorption (B.E.T.) method of Bruanauer, Emmet, and Teller, Journal of American Chemical Society, Vol. 60, 1938, p. 309, with nitrogen as the adsorption gas.

The agglomerates may be formed using a variety of techniques. A precursor tantalum powder, for instance, may be formed by reducing a tantalum salt (e.g., potassium fluotantalate ($K_2TaF_7$), sodium fluotantalate ($Na_2TaF_7$), tantalum pentachloride ($TaCl_5$), etc.) with a reducing agent (e.g., hydrogen, sodium, potassium, magnesium, calcium, etc.). Such powders may be agglomerated in a variety of ways, such as through one or multiple heat treatment steps at a temperature of from about 700° C. to about 1400° C., in some embodiments from about 750° C. to about 1200° C., and in some embodiments, from about 800° C. to about 1100° C. Heat treatment may occur in an inert or reducing atmosphere. For example, heat treatment may occur in an atmosphere containing hydrogen or a hydrogen-releasing compound (e.g., ammonium chloride, calcium hydride, magnesium hydride, etc.) to partially sinter the powder and decrease the content of impurities (e.g., fluorine). If desired, agglomeration may also be performed in the presence of a getter material, such as magnesium. After thermal treatment, the highly reactive coarse agglomerates may be passivated by gradual admission of air. Other suitable agglomeration techniques are also described in U.S. Pat. No. 6,576,038 to Rao; U.S. Pat. No. 6,238,456 to Wolf, et al.; U.S. Pat. No. 5,954,856 to Pathare et al.; U.S. Pat. No. 5,082,491 to Rerat; U.S. Pat. No. 4,555,268 to Getz; U.S. Pat. No. 4,483,819 to Albrecht, et al.; U.S. Pat. No. 4,441,927 to Getz, et al.; and U.S. Pat. No. 4,017,302 to Bates, et al.

The desired size and/or shape of the agglomerates may be achieved by simply controlling various processing parameters as is known in the art, such as the parameters relating to powder formation (e.g., reduction process) and/or agglomeration (e.g., temperature, atmosphere, etc.). Milling techniques may also be employed to grind a precursor powder to the desired size. Any of a variety of milling techniques may be utilized to achieve the desired particle characteristics. For example, the powder may initially be dispersed in a fluid medium (e.g., ethanol, methanol, fluorinated fluid, etc.) to form a slurry. The slurry may then be combined with a grinding media (e.g., metal balls, such as tantalum) in a mill. The number of grinding media may generally vary depending on the size of the mill, such as from about 100 to about 2000, and in some embodiments from about 600 to about 1000. The starting powder, the fluid medium, and grinding media may be combined in any proportion. For example, the ratio of the starting powder to the grinding media may be from about 1:5 to about 1:50. Likewise, the ratio of the volume of the fluid medium to the combined volume of the starting powder may be from about 0.5:1 to about 3:1, in some embodiments from about 0.5:1 to about 2:1, and in some embodiments, from about 0.5:1 to about 1:1. Some examples of mills that may be used in the present invention are described in U.S. Pat. Nos. 5,522,558; 5,232,169; 6,126,097; and 6,145,765. Milling may occur for any predetermined amount of time needed to achieve the target size. For example, the milling time may range from about 30 minutes to about 40 hours, in some embodiments, from about 1 hour to about 20 hours, and in some embodiments, from about 5 hours to about 15 hours. Milling may be conducted at any desired temperature, including at room temperature or an elevated temperature. After milling, the fluid medium may be separated or removed from the powder, such as by air-drying, heating, filtering, evaporating, etc.

Various other conventional treatments may also be employed in the present invention to improve the properties of the powder. For example, in certain embodiments, the agglomerates may be doped with sinter retardants in the presence of a dopant, such as aqueous acids (e.g., phosphoric acid). The amount of the dopant added depends in part on the surface area of the powder, but is typically present in an amount of no more than about 200 parts per million ("ppm"). The dopant may be added prior to, during, and/or subsequent to any heat treatment step(s). The agglomerates may also be subjected to one or more deoxidation treatments to improve ductility. For example, the agglomerates may be exposed to a getter material (e.g., magnesium), such as described in U.S. Pat. No. 4,960,471. The temperature at which deoxidation occurs may vary, but typically ranges from about 700° C. to about 1600° C., in some embodiments from about 750° C. to about 1200° C., and in some embodiments, from about 800° C. to about 1000° C. The total time of deoxidation treatment(s) may range from about 20 minutes to about 3 hours. Deoxidation also preferably occurs in an inert atmosphere (e.g., argon). Upon completion of the deoxidation treatment(s), the magnesium or other getter material typically vaporizes and forms a precipitate on the cold wall of the furnace. To ensure removal of the getter material, however, the agglomerates may be subjected to one or more acid leaching steps, such as with nitric acid, hydrofluoric acid, etc.

Certain additional components may also be incorporated into the powder. For example, the powder may be optionally mixed with a binder to ensure that the agglomerates adequately adhere to each other when applied to the substrate. Suitable binders may include, for instance, poly(vinyl butyral); poly(vinyl acetate); poly(vinyl alcohol); poly(vinyl pyrrolidone); cellulosic polymers, such as carboxymethylcellulose, methyl cellulose, ethyl cellulose, hydroxyethyl cellulose, and methylhydroxyethyl cellulose; atactic polypropylene, polyethylene; polyethylene glycol (e.g., Carbowax™ from Dow Chemical Co.); polystyrene, poly(butadiene/styrene); polyamides, polyimides, and polyacrylamides, high molecular weight polyethers; copolymers of ethylene oxide and propylene oxide; fluoropolymers, such as polytetrafluoroethylene, polyvinylidene fluoride, and fluoro-olefin copolymers; acrylic polymers, such as sodium polyacrylate, poly(lower alkyl acrylates), poly(lower alkyl methacrylates) and copolymers of lower alkyl acrylates and methacrylates; and fatty acids and waxes, such as stearic and other soapy fatty acids, vegetable wax, microwaxes (purified paraffins), etc. The binder may be dissolved and dispersed in a solvent. Exemplary solvents may include water, alcohols, and so forth.

Any of a variety of techniques may generally be employed to apply the agglomerates to the metal substrate in accordance with the present invention, such as heat treating, thermal sintering, sputtering, screen-printing, dipping, electrophoretic coating, electron beam deposition, spraying, roller pressing, brushing, doctor blade casting, and vacuum deposition. Excess agglomerates may be removed, for instance, by inverting the substrate. Upon application, the agglomerates may optionally be heated to remove any binder/lubricant present. Heating may occur, for instance, at a temperature of from about 40° C. to about 800° C. Once applied, one or more hydrogen protection layers of the agglomerates are typically formed on the substrate surface. The thickness of a protection layer may vary depending on the size and configuration of the metal substrate, anode, etc. Generally speaking, a protection layer may have a thickness of from about 1 to about 1000 micrometers, in some embodiments from about 2 to about 800 micrometers, and in some embodiments, from about 5 to about 500 micrometers. The extent to which the agglomerates cover the metal substrate may also vary. For example, in certain embodiments, the protection layer may be substantially continuous such that they agglomerates cover a substantial portion, if not all of the surface of the substrate. In yet other embodiments, the protection layer may be discontinuous such that the agglomerates are applied in, for example, a spaced-apart fashion over the surface so that they form "island-like" structures. Regardless of how the protection layer is formed, the agglomerates may be sintered so that a bond forms between the particles and optionally the metal substrate. For example, sintering may be conducted at a temperature of from about 800° C. to about 2000° C., in some embodiments from about 1200° C. to about 1800° C., and in some embodiments, from about 1500° C. to about 1700° C., for a time of from about 5 minutes to about 100 minutes, and in some embodiments, from about 10 minutes to about 50 minutes. This may occur in one or more steps. If desired, sintering may occur in a reducing atmosphere, such as in a vacuum, inert gas, hydrogen, etc. The reducing atmosphere may be at a pressure of from about 10 Torr to about 2000 Torr, in some embodiments from about 100 Torr to about 1000 Torr, and in some embodiments, from about 100 Torr to about 930 Torr. Mixtures of hydrogen and other gases (e.g., argon or nitrogen) may also be employed.

Regardless of the total number of layers employed, the total target thickness of the conductive coating may generally vary depending on the desired properties of the capacitor. Typically, the conductive coating has a thickness of from about 0.5 micrometers ("µm") to about 300 µm, in some embodiments from about 1 µm to about 250 µm, and in some embodiments, from about 10 µm to about 150 µm. It should be understood that the thickness of the coating is not necessarily the same at all locations on the substrate. Nevertheless, the average thickness of the coating on the substrate generally falls within the ranges noted above.

II. Anode

The anode of the electrolytic capacitor includes a porous body that may be formed from a valve metal composition, such as described above. In one embodiment, for example, the anode is formed from a tantalum powder. The powder may contain agglomerates having any of a variety of shapes, such as nodular, angular, flake, etc., as well as mixtures thereof. In certain cases, the anode may be formed from a powder having a high specific charge. That is, the powder may have a specific charge of about 70,000 microFarads*Volts per gram ("µF*V/g") or more, in some embodiments about 80,000 µF*V/g or more, in some embodiments about 90,000 µF*V/g or more, in some embodiments about 100,000 µF*V/g or more, and in some embodiments, from about 120,000 to about 350,000 µF*V/g. Of course, although powders of a high specific charge are normally desired, it is not necessarily a requirement. In certain embodiments, for example, powders having a specific charge of less than about 70,000 microFarads*Volts per gram ("µF*V/g"), in some embodiments about 2,000 µF*V/g to about 65,000 µF*V/g, and in some embodiments, from about 5,000 to about 50,000 µF*V/g.

Once formed, the resulting powder may be compacted using any conventional powder press mold. For example, the press mold may be a single station compaction press using a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. The powder may be compacted around an anode lead (e.g., tantalum wire). It should be further appreciated that the anode lead may alternatively be attached (e.g., welded) to the anode body subsequent to pressing and/or sintering of the anode body. If desired, any binder may be removed after compression, such as by heating the formed pellet under vacuum at a certain temperature (e.g., from about 150° C. to about 500° C.) for several minutes. Alternatively, binder may also be removed by contacting the pellet with an aqueous solution, such as described in U.S. Pat. No. 6,197,252 to Bishop, et al. Regardless, the pressed anode body is sintered to form a porous, integral mass. The sintering conditions may be within the ranges noted above.

Figure 4:
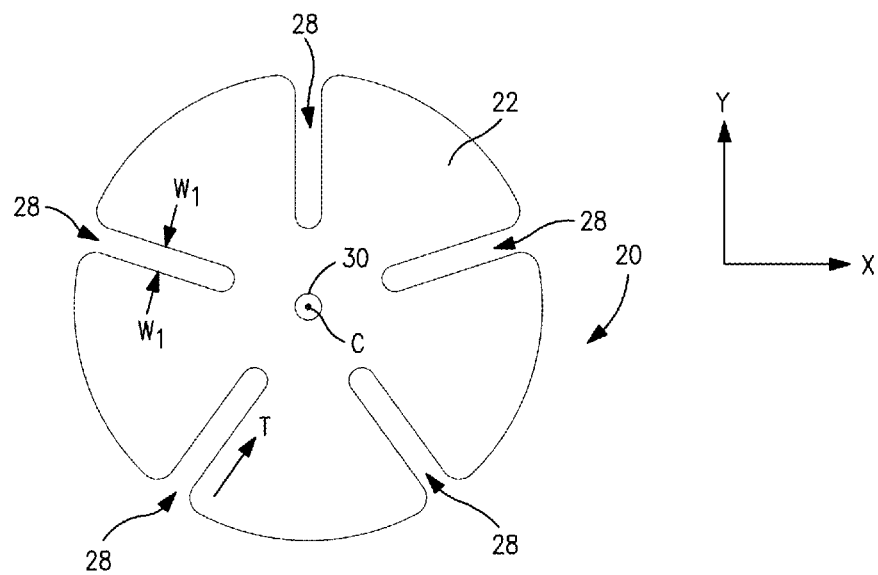
FIG. 4 is a top view of the anode of FIG. 2.

Referring to FIGS. 2-4, for example, one embodiment of an anode 20 is shown that contains a porous, sintered body 22 having at least one sidewall 24 positioned between a proximal end 34 and an opposing distal end 36. The cross-sectional shape of the proximal end 34 and/or the distal end 36 may generally vary based on the desired shape of the anode body 22. In this particular embodiment, for example, both ends 34 and 36 have a circular cross-sectional shape such that the anode body 22 is generally cylindrical. Other suitable shapes may include, for instance, square, rectangular, triangular, hexagonal, octagonal, heptagonal, pentagonal, trapezoidal, elliptical, star, sinusoidal, etc. The anode body 22 also has a length in the longitudinal direction "z" defined between the ends 34 and 36, and a width in the "x" direction and depth in the "y" direction. In the illustrated embodiment, the width and depth are both defined between the sidewalls 24. Although by no means a requirement, the length of the anode body 22 is typically greater than its width and/or depth. For example, in certain embodiments, the ratio of the length to both the width and depth may be from about 1 to about 30, in some embodiments from about 1.1 to about 10, and in some embodiments, from about 1.5 to about 5. The length of the anode 20 may, for example, range from about 0.5 to about 100 millimeters, in some embodiments from about 1 to about 60 millimeters, and in some embodiments, from about 5 to about 30 millimeters. The width of the anode body 22 may range from about 0.5 to about 50 millimeters, in some embodiments from about 1 to about 40 millimeters, and in some embodiments, from about 4 to about 30 millimeters. Likewise, the depth of the anode body 22 may range from about 0.5 to about 50 millimeters, in some embodiments from about 1 to about 40 millimeters, and in some embodiments, from about 4 to about 30 millimeters. Of course, when the anode body is cylindrical in nature, its width and depth will be the same.

In certain embodiments, at least one longitudinally extending channel is recessed into the anode body. Such channels may be formed during pressing as would be known to those skilled in the art. For example, the press mold may contain one or more longitudinal indentations that correspond to the desired shape of the channels. In this manner, the powder is compressed around the indentations so that when removed from the mold, the resulting anode body contains longitudinal channels at those areas where the longitudinal indentations were located in the mold.

Figure 5:
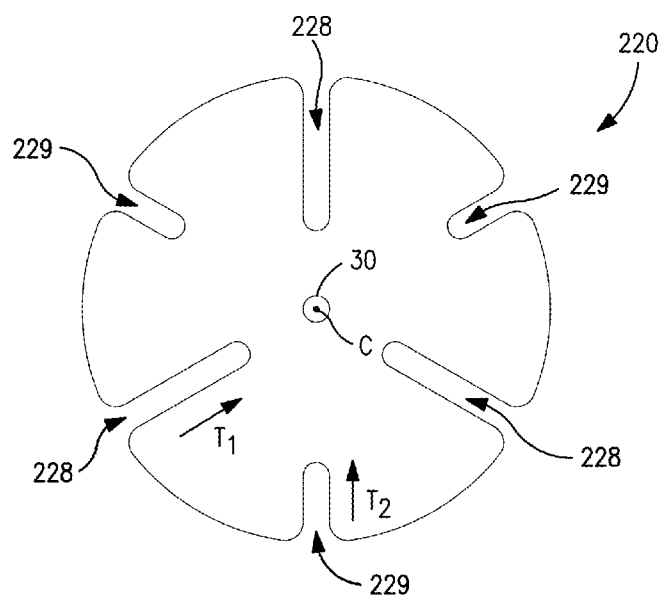
FIG. 5 is a top view of another embodiment of an anode that may be employed in the wet electrolytic capacitor of the present invention.

The channels may have a relatively high aspect ratio (length divided by width), such as about 2 or more, in some embodiments about 5 or more, in some embodiments from about 10 to about 200, in some embodiments from about 15 to about 150, in some embodiments from about 20 to about 100, and in some embodiments, from about 30 to about 60. Such channels can significantly increase the outer surface area of the anode, which may enhance the degree to which the anode can dissipate heat and increase the likelihood that the anodizing electrolyte will pass into the pores of the anode body during anodic oxidation. Referring again to FIGS. 2-4, for instance, the anode body 22 may contain channels 28 that are recessed into the sidewall 24. The channels 28 are "longitudinally extending" in the sense that they possess a length in the longitudinal direction "z" of the anode body 22. However, while the channels 28 of FIGS. 2-4 are substantially parallel with the longitudinal direction, this is by no means a requirement. For example, other suitable embodiments may include one or more longitudinally extending channels that are in the form of a spiral, helix, etc., which are not parallel with the longitudinal of the anode body. The number of such longitudinally extending channels may vary, but is typically from 1 to 20, in some embodiments from 2 to 15, and in some embodiments, from 4 to 10. When multiple channels are employed, it is generally desired that they are distributed symmetrically and equidistant about a center longitudinal axis of the anode, although this is by no means a requirement. In FIGS. 2-4, for example, the depicted anode body 22 contains five (5) separate channels 28. FIG. 5, on the other hand, shows an alternative embodiment in which six (6) separate channels 228 are employed. In each of the particular embodiments, however, the channels are distributed in a generally symmetric manner about the longitudinal center "C" of the anode body, At least a portion of the channels 28 may have a relatively high aspect ratio (length divided by width). The length "$L_1$" (FIG. 3) of the channels 28 may, for example, range from about 0.5 to about 100 millimeters, in some embodiments from about 1 to about 60 millimeters, and in some embodiments, from about 5 to about 30 millimeters. The width "$W_1$" of the channels 28 (FIGS. 3 and 4) may likewise range from about 0.01 to about 20 millimeters, in some embodiments from about 0.02 to about 15 millimeters, in some embodiments from about 0.05 to about 4 millimeters, and in some embodiments, from about 0.1 to about 2 millimeters.

The channels 28 shown in FIGS. 2-4 extend in the longitudinal direction "L" along the entire length of the anode body 22 and intersect both the proximal end 34 and the distal end 36. It should be understood, however, that one or more channels may also extend along only a portion of the anode body length so that they intersect only one end of the anode body, or so that they do not intersect either end.

The extent to which the channels are recessed into the anode body may be selectively controlled to achieve a balance between increased surface and integrity of the anode structure. That is, if the depth of the channels is too great, it may be difficult to press the anode into a physically strong structure. Likewise, if the depth is too small, the desired benefits may not be achieved. Thus, in most embodiments, the channels are recessed so that they extend in a direction that is from about 2% to about 60%, in some embodiments from about 5% to about 50%, and in some embodiments, from about 10% to about 45% of the thickness of the anode body in the same direction. Referring again to FIG. 3, for example, one of the channels 28 is shown as extending in a direction "T." In this embodiment, the length of the channel 28 in the direction "T" divided by the thickness of the porous body 22 in the direction "T", multiplied by 100, is within the percentages referenced above.

Of course, the depth of each of the channels need not be the same. Referring to FIG. 5, for example, one embodiment of an anode 220 is shown that contains first channels 228 and second channels 229. In this particular embodiment, the first channels 228 extend into the anode body to a greater degree than the second channels 229. One of the first channels 228 may, for example, extend in a direction "$T_1$" that is from about 15% to about 60%, in some embodiments from about 20% to about 50%, and in some embodiments, from about 25% to about 45% of the thickness of the anode body in the same direction. Likewise, one of the second channels 229 may extend in a direction "$T_2$" that is from about 2% to about 40%, in some embodiments from about 5% to about 35%, and in some embodiments from about 10% to about 25% of the anode body in the same direction. Such a configuration can effectively combine the benefits of the deeper channels (e.g., greater surface area) with those of the shallower channels (e.g., greater physical integrity). In such embodiments, the number of deeper channels may be from 1 to 10, in some embodiments from 2 to 6, and in some embodiments, from 2 to 4, and the number of shallower channels may likewise be from 1 to 10, in some embodiments from 2 to 6, and in some embodiments, from 2 to 4.

Typically, the anode also contains an anode lead wire that helps connect the anode to the terminations of the resulting capacitor. The lead wire may be formed from any electrically conductive material, such as tantalum, niobium, nickel, aluminum, hafnium, titanium, etc., as well as oxides and/or nitrides of thereof. Although not necessarily required, it is often desired that the lead wire extend in the same longitudinal direction as the channels. In the embodiment of FIGS. 2-4, for example, an anode lead wire 30 extends in the longitudinal "z" direction from the proximal end 34 of the anode body 22. Electrical contact with the anode 20 may be accomplished by in a variety of ways, such as by coupling the lead wire 30 using resistance or laser welding. Alternatively, the lead wire 30 may be embedded into the anode body during its formation (e.g., prior to sintering).

Once formed, the porous anode body is anodically oxidized ("anodized") so that a dielectric layer is formed over and/or within the anode body. For example, a tantalum (Ta) anode body may be anodized to tantalum pentoxide ($Ta_2O_5$). Anodization may be performed using electrolyte solutions such as those described above. Typically, the voltage at which anodic oxidation of the anode occurs ranges from about 4 to about 250 V, and in some embodiments, from about 9 to about 200 V, and in some embodiments, from about 20 to about 150 V.

III. Working Electrolyte

The working electrolyte is in electrical communication with the metal substrate and anode. The electrolyte is a fluid that may be impregnated within the anode, or it may be added to the capacitor at a later stage of production. The fluid electrolyte generally uniformly wets the dielectric on the anode. Various suitable electrolytes are described in U.S. Pat. Nos. 5,369,547 and 6,594,140 to Evans, et al. Typically, the electrolyte is ionically conductive in that has an electrical conductivity of from about 0.1 to about 20 Siemens per centimeter ("S/cm"), in some embodiments from about 0.2 to about 15 S/cm, and in some embodiments, from about 0.5 to about 10 S/cm, determined at a temperature of about 23° C. using any known electric conductivity meter (e.g., Oakton Con Series 11). The fluid electrolyte is generally in the form of a liquid, such as a solution (e.g., aqueous or non-aqueous), colloidal suspension, gel, etc. For example, the electrolyte may be an aqueous solution of an acid (e.g., sulfuric acid, phosphoric acid, or nitric acid), base (e.g., potassium hydroxide), or salt (e.g., ammonium salt, such as a nitrate), as well any other suitable electrolyte known in the art, such as a salt dissolved in an organic solvent (e.g., ammonium salt dissolved in a glycol-based solution). Various other electrolytes are described in U.S. Pat. Nos. 5,369,547 and 6,594,140 to Evans, et al.

The desired ionic conductivity may be achieved by selecting ionic compound(s) (e.g., acids, bases, salts, and so forth) within certain concentration ranges. In one particular embodiment, salts of weak organic acids may be effective in achieving the desired conductivity of the electrolyte. The cation of the salt may include monatomic cations, such as alkali metals (e.g., $Li^+$, $Na^+$, $K^+$, $Rb^+$, or $Cs^+$), alkaline earth metals (e.g., $Be^{2+}$, $Mg^{2+}$, $Ca^{2+}$, $Sr^{2+}$ or $Ba^{2+}$), transition metals (e.g., $Ag^+$, $Fe^{2+}$, $Fe^{3+}$, etc.), as well as polyatomic cations, such as $NH_4^+$. The monovalent ammonium ($NH_4^+$), sodium ($K^+$), and lithium ($Li^+$) are particularly suitable cations for use in the present invention. The organic acid used to form the anion of the salt may be "weak" in the sense that it typically has a first acid dissociation constant ($pK_{a1}$) of about 0 to about 11, in some embodiments about 1 to about 10, and in some embodiments, from about 2 to about 10, determined at about 23° C. Any suitable weak organic acids may be used in the present invention, such as carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid (e.g., dextotartaric acid, mesotartaric acid, etc.), citric acid, formic acid, acetic acid, glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; blends thereof, and so forth. Polyprotic acids (e.g., diprotic, triprotic, etc.) are particularly desirable for use in forming the salt, such as adipic acid ($pK_{a1}$ of 4.43 and $pK_{a2}$ of 5.41), α-tartaric acid ($pK_{a1}$ of 2.98 and $pK_{a2}$ of 4.34), meso-tartaric acid ($pK_{a1}$ of 3.22 and $pK_{a2}$ of 4.82), oxalic acid ($pK_{a1}$ of 1.23 and $pK_{a2}$ of 4.19), lactic acid ($pK_{a1}$ of 3.13, $pK_{a2}$ of 4.76, and $pK_{a3}$ of 6.40), etc.

While the actual amounts may vary depending on the particular salt employed, its solubility in the solvent(s) used in the electrolyte, and the presence of other components, such weak organic acid salts are typically present in the electrolyte in an amount of from about 0.1 to about 25 wt. %, in some embodiments from about 0.2 to about 20 wt. %, in some embodiments from about 0.3 to about 15 wt. %, and in some embodiments, from about 0.5 to about 5 wt. %.

The electrolyte is typically aqueous in that it contains an aqueous solvent, such as water (e.g., deionized water). For example, water (e.g., deionized water) may constitute from about 20 wt. % to about 95 wt. %, in some embodiments from about 30 wt. % to about 90 wt. %, and in some embodiments, from about 40 wt. % to about 85 wt. % of the electrolyte. A secondary solvent may also be employed to form a solvent mixture. Suitable secondary solvents may include, for instance, glycols (e.g., ethylene glycol, propylene glycol, butylene glycol, triethylene glycol, hexylene glycol, polyethylene glycols, ethoxydiglycol, dipropyleneglycol, etc.); glycol ethers (e.g., methyl glycol ether, ethyl glycol ether, isopropyl glycol ether, etc.); alcohols (e.g., methanol, ethanol, n-propanol, iso-propanol, and butanol); ketones (e.g., acetone, methyl ethyl ketone, and methyl isobutyl ketone); esters (e.g., ethyl acetate, butyl acetate, diethylene glycol ether acetate, methoxypropyl acetate, ethylene carbonate, propylene carbonate, etc.); amides (e.g., dimethylformamide, dimethylacetamide, dimethylcaprylic/capric fatty acid amide and N-alkylpyrrolidones); sulfoxides or sulfones (e.g., dimethyl sulfoxide (DMSO) and sulfolane); and so forth. Such solvent mixtures typically contain water in an amount from about 40 wt. % to about 80 wt. %, in some embodiments from about 50 wt. % to about 75 wt. %, and in some embodiments, from about 55 wt. % to about 70 wt. % and secondary solvent(s) in an amount from about 20 wt. % to about 60 wt. %, in some embodiments from about 25 wt. % to about 50 wt. %, and in some embodiments, from about 30 wt. % to about 45 wt. %. The secondary solvent(s) may, for example, constitute from about 5 wt. % to about 45 wt. %, in some embodiments from about 10 wt. % to about 40 wt. %, and in some embodiments from about 15 wt. % to about 35 wt. % of the electrolyte.

If desired, the electrolyte may be relatively neutral and have a pH of from about 4.5 to about 8.0, in some embodiments from about 5.0 to about 7.5, and in some embodiments, from about 5.5 to about 7.0. One or more pH adjusters (e.g., acids, bases, etc.) may be employed to help achieve the desired pH. In one embodiment, an acid is employed to lower the pH to the desired range. Suitable acids include, for instance, organic acids such as described above; inorganic acids, such as hydrochloric acid, nitric acid, sulfuric acid, phosphoric acid, polyphosphoric acid, boric acid, boronic acid, etc.; and mixtures thereof. Although the total concentration of pH adjusters may vary, they are typically present in an amount of from about 0.01 wt. % to about 10 wt. %, in some embodiments from about 0.05 wt. % to about 5 wt. %, and in some embodiments, from about 0.1 wt. % to about 2 wt. % of the electrolyte.

The electrolyte may also contain other components that help improve the electrical performance of the capacitor. For instance, a depolarizer may be employed in the electrolyte to help inhibit the evolution of hydrogen gas at the cathode of the electrolytic capacitor, which could otherwise cause the capacitor to bulge and eventually fail. When employed, the depolarizer normally constitutes from about 1 to about 500 parts per million ("ppm"), in some embodiments from about 10 to about 200 ppm, and in some embodiments, from about 20 to about 150 ppm of the electrolyte. Suitable depolarizers may include nitroaromatic compounds, such as 2-nitrophenol, 3-nitrophenol, 4-nitrophenol, 2-nitrobenzonic acid, 3-nitrobenzonic acid, 4-nitrobenzonic acid, 2-nitroace tophenone, 3-nitroacetophenone, 4-nitroacetophenone, 2-nitroanisole, 3-nitroanisole, 4-nitroanisole, 2-nitrobenzaldehyde, 3-nitrobenzaldehyde, 4-nitrobenzaldehyde, 2-nitrobenzyl alcohol, 3-nitrobenzyl alcohol, 4-nitrobenzyl alcohol, 2-nitrophthalic acid, 3-nitrophthalic acid, 4-nitrophthalic acid, and so forth. Particularly suitable nitroaromatic depolarizers for use in the present invention are nitrobenzoic acids, anhydrides or salts thereof, substituted with one or more alkyl groups (e.g., methyl, ethyl, propyl, butyl, etc.). Specific examples of such alkyl-substituted nitrobenzoic compounds include, for instance, 2-methyl-3-nitrobenzoic acid; 2-methyl-6-nitrobenzoic acid; 3-methyl-2-nitrobenzoic acid; 3-methyl-4-nitrobenzoic acid; 3-methyl-6-nitrobenzoic acid; 4-methyl-3-nitrobenzoic acid; anhydrides or salts thereof; and so forth.

IV. Sealing Assembly

The anode and working electrolyte of the capacitor are generally positioned within the interior of the casing. In certain embodiments, the casing may define an opening that is closed by a sealing assembly. The sealing assembly includes, for instance, a hermetic seal that is generally formed from an insulative material, such as glass. If desired, a conductive tube may be employed that has an orifice of a size and shape sufficient to accommodate the anode lead. The conductive tube is typically formed from a metal, such as tantalum, niobium, aluminum, nickel, hafnium, titanium, copper, silver, steel (e.g., stainless), alloys thereof (e.g., electrically conductive oxides), composites thereof (e.g., metal coated with electrically conductive oxide), and so forth. In such embodiments, the conductive tube may pass through a bore within the hermetic seal so that it is electrically insulated.

The arrangement of the sealing assembly within a capacitor is not critical and may vary as would be appreciated by those skilled in the art. Referring to FIG. 1, for example, one particular embodiment of a capacitor 100 is shown. As shown, the capacitor 100 contains a casing 12 having a sidewall 14 and a lower wall 16. Multiple sidewalls may be employed in such embodiments where the casing is not cylindrical. A conductive coating 17 is also formed on at least a portion of the casing 12 as discussed above. For example, the conductive coating 17 may be disposed on the inner surfaces of the sidewall 14 and the lower wall 16. An anode 20 is also positioned within an interior 11 of the casing 12. An anode lead 30 may extend from the anode 20 in a longitudinal direction through a conductive tube 56.

The capacitor 100 also contains a sealing assembly 50. In this particular embodiment, the sealing assembly covers an opening 59 defined between crimped portions of the casing 12. Alternatively, however, a lid may be provided as is known in the art that defines the opening. In any event, a hermetic seal 54 (e.g., glass-to-metal seal) is positioned within the opening 59 in the illustrated embodiment that defines a bore through which the conductive tube 56 and the anode lead 30 can pass. The sealing assembly 50 also includes a barrier seal 70, such as a seal formed from an elastomeric material. The seal 70 may have a generally cylindrical shape and contain a bore coaxially located therein through which the conductive tube 56 and the anode lead 42 can pass. In this manner, the barrier seal 70 can cover at least a portion of the lower surface of the hermetic seal 54 to limit its contact with any electrolyte. If desired, the barrier seal 70 may cover a substantial portion of the lower surface of the hermetic seal 54. By "substantial portion", it is generally meant that the seal covers about 80% or more of the surface, in some embodiments about 90% or more of the surface, and in some embodiments, about 100% of the surface. As shown in FIG. 1, the barrier seal 70 also typically covers at least a portion of the conductive tube 56.

In addition to the sealing assembly discussed above, the capacitor of the present invention may also contain one or more secondary seals. For example, additional gaskets or bobbin may be employed that are formed from non-elastomeric insulative materials, such as polytetrafluorethylene ("PTFE"). In one embodiment, for example, a bobbin 90 may be positioned between the anode 20 and the barrier seal 70. Elastomeric rings 92 may also be employed, such as adjacent to the sidewall 14 of the casing 12. The elastomeric rings 92 may be formed from a high-temperature elastomer, such as described above, or from another type of elastomeric material. Also, if desired, a support may be provided in contact with the anode to help ensure that it remains mechanically stable during use. The support may be from an insulative material, such as polytetrafluorethylene ("PTFE"). One example of such a support is shown in FIG. 2 as element 55, which is positioned adjacent to and in contact with the lower surface of the anode 20. An external positive lead 82 may likewise be connected to the anode lead 30 at an end of the conductive tube 56 via a weld joint 80 and external negative lead 83 may be connected to the lower wall 16 of the casing 12.

Regardless of the particular configuration, the resulting capacitor of the present invention may exhibit excellent electrical properties. For example, the capacitor may exhibit a high energy density. Energy density is generally determined according to the equation $E=\frac{1}{2}*CV^2$, where C is the capacitance in farads (F) and V is the working voltage of capacitor in volts (V). The energy density may, for example, be about 2.0 joules per cubic centimeter (J/cm$^3$) or more, in some embodiments about 3.0 J/cm$^3$, in some embodiments from about 4.0 J/cm$^3$ to about 10.0 J/cm$^3$, and in some embodiments, from about 4.5 to about 8.0 J/cm$^3$. The capacitance may likewise be about 1 milliFarad per square centimeter ("mF/cm$^2$") or more, in some embodiments about 2 mF/cm$^2$ or more, in some embodiments from about 5 to about 50 mF/cm$^2$, and in some embodiments, from about 8 to about 20 mF/cm$^2$, as determined at an operating frequency of 120 Hz. The equivalent series resistance ("ESR") may also be less than about 500 milliohms, in some embodiments less than about 400 milliohms, in some embodiments less than about 300 milliohms, and in some embodiments, from about 1 to about 200 milliohms, as determined at a frequency of 120 Hz. In addition, the leakage current, which generally refers to the current flowing from one conductor to an adjacent conductor through an insulator, can be maintained at relatively low levels. For example, the numerical value of the normalized leakage current of a capacitor of the present invention is, in some embodiments, less than about 1 µA/µF*V, in some embodiments less than about 0.5 µA/µF*V, and in some embodiments, less than about 0.1 µA/µF*V, where µA is microamps and µF*V is the product of the capacitance and the rated voltage. Notably, due to the unique nature of the conductive coating of the present invention, the present inventors have discovered that such capacitance, ESR, and/or normalized leakage current values may even be maintained after aging at high temperatures. For example, the values may be maintained at temperatures ranging from about 50° C. to about 200° C. (e.g., 85° C.) for a substantial period of time, such as about 100 hours or more, in some embodiments from about 300 hours to about 2500 hours, and in some embodiments, from about 400 hours to about 1500 hours (e.g., 500 hours, 600 hours, 700 hours, 800 hours, 900 hours, 1000 hours, 1100 hours, or 1200 hours).

The electrolytic capacitor of the present invention may be used in various applications, including but not limited to micro-inverters; micro-UPS devices; medical devices, such as implantable defibrillators, pacemakers, cardioverters, neural stimulators, drug administering devices, etc.; automotive applications; military applications, such as RADAR systems; consumer electronics, such as radios, televisions, etc.; and so forth.

The present invention may be better understood by reference to the following examples.

Test Procedures

Equivalent Series Resistance ("ESR")

Equivalence series resistance may be measured using a Keithley 3330 Precision LCZ meter with Kelvin Leads 2.2 volt DC bias and a 0.5 volt peak to peak sinusoidal signal. The operating frequency may be 120 Hz and the temperature may be 23° C.±2° C.

Capacitance ("CAP")

The capacitance may be measured using a Keithley 3330 Precision LCZ meter with Kelvin Leads with 2.2 volt DC bias and a 0.5 volt peak to peak sinusoidal signal. The operating frequency may be 120 Hz and the temperature may be 23° C.±2° C.

Leakage Current:

Leakage current ("DCL") may be measured using a leakage test meter at a temperature of 85° C.±2° C. and at the rated voltage after a minimum of 60 seconds.

Materials Employed

The following materials were employed in the examples.
PdCl$_2$=Palladium(11) chloride (Merck);
EDT=3,4-ethylenedioxythiophene (Hereaus);
pTSA=p-toluene sulfonic acid, sodium salt; and
POE-10-LE=polyoxyethylene-10-fauryl ether (or decaethylene glycol monodecyl ether).

EXAMPLE 1

Figure 6:
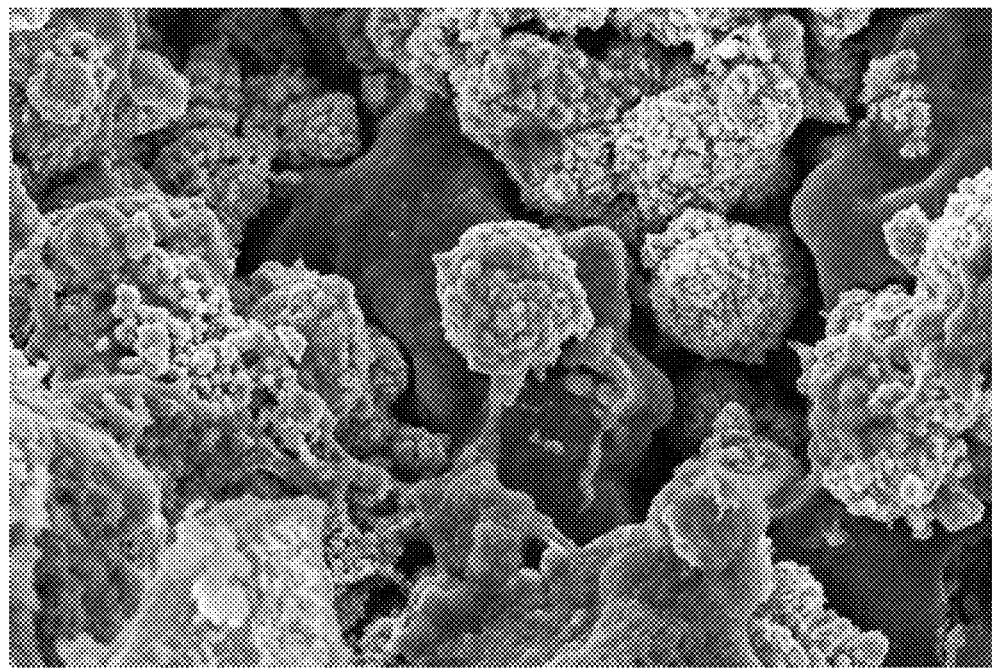
FIG. 6 is a FESEM microphotograph (25 k magnification) showing the tantalum/palladium/PEDT structure of a sample formed in Example 1.

Initially, 10 samples of cylindrical tantalum cans were sandblasted with a JetStreem Blaster II (SCM System, Inc.) for about 20 seconds. The samples were degreased in water in an ultrasonic bath and dried at a temperature of 85° C. for 5 minutes. An amount of 0.3 g of PdCl$_2$ was added to 25 ml of 1.0M hydrochloric acid in a 50 ml flask. The can was filled with the previously prepared PdCl$_4^{2-}$ aqueous acidic solution and placed in a copper receptacle connecting the can to the negative pole of a power supply. A Pt wire was electrically connected to the positive pole of the power supply and inserted into the can and $PdCl_4^{2-}$ aqueous acidic solution. Electro-deposition was performed for about 15 minutes using a constant current setting of 50 mA to form a structure of palladium. The cans were then rinsed in water to remove reaction by-products and dried at 85° C. for 5 minutes. 8 to 9 mg of palladium was deposited onto each tantalum can. A precursor solution was thereafter applied to the palladium-deposited surface that contained 4 g of ethanol (Sigma-Aldrich), 0.1 g of methylpyrrolidone (Sigma-Aldrich), 1 g of EDT, and 10 g of 40% butanol solution of iron(III)-p-toluene sulfonate (Heraeus). The tantalum cans were filled to the control level with the polymerization precursor solution for 5 minutes and were then put into a drying oven at 85° C. for 15 minutes. The resulting structure of poly(3,4-ethylenedioxythiophene) was washed in methanol to remove reaction by-products for 5 minutes and the tantalum cans were put into a drying oven at 85° C. for 5 minutes. This polymerization cycle was repeated 4 times. 4-5 mg of poly(3,4-ethylenedioxythiophene) was deposited onto each palladium-coated tantalum can. FIG. 6 is a microphotograph of the resulting tantalum/palladium/PEDT structure.

Next, 10 samples of a cylindrical anode were pressed from tantalum powder (70,000 μF*V/g) with six symmetrical longitudinally extending channels recessed into the anode body. The anodes were sintered at a temperature of 1440° C. for 10 minutes and anodized to 75V (the single anode exhibited a capacitance of 3000 μF at a frequency of 120 Hz) were added into the previously prepared cans. The electrolyte was a 5.0 M aqueous solution of sulfuric acid (specific gravity of 1.26 g/cm³). The components were then assembled into a wet capacitor.

EXAMPLE 2

Figure 7:
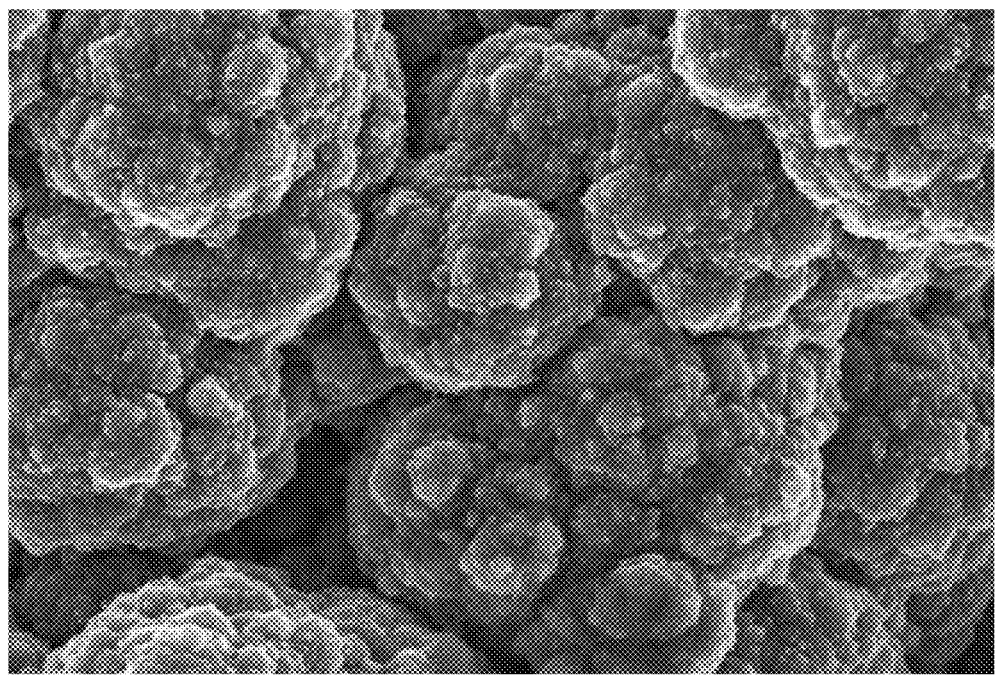
FIG. 7 is a FESEM microphotograph (25 k magnification) showing the tantalum/PEDT structure of a sample formed in Example 2.

Wet capacitors were formed in the manner described in Example 1, except that the palladium precoat was not employed. FIG. 7 is a microphotograph of the resulting tantalum/PEDT structure.

The capacitors of Examples 1 and 2 were then tested in the manner described above. The measurements were taken and then repeated at different times for 2000 hours of total life testing at an applied rated voltage of 50V. The results are set forth below.

|  | Example 1 | | | Example 2 | | |
| --- | --- | --- | --- | --- | --- | --- |
| time [h] | CAP [uF] | ESR [Ohm] | DCL [uA] | CAP [uF] | ESR [Ohm] | DCL [uA] |
| 0 | 2710 | 0.273 | 587.30 | 2700 | 0.283 | 904.24 |
| 100 | 2460 | 0.321 | — | 50 | 7.340 | — |
| 500 | 1906 | 0.494 | — | 8 | 10.182 | — |
| 1000 | 1235 | 1.232 | 57.36 | 3 | 29.316 | 53.74 |
| 1500 | 1365 | 1.322 | — | 3 | 34.646 | — |
| 2000 | 1325 | 1.356 | 112.35 | 2 | 25.555 | 82.50 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A wet electrolytic capacitor comprising:
   an anode formed from an anodically oxidized sintered porous body;
   a fluidic working electrolyte; and
   a casing within which the anode and working electrolyte are positioned, wherein the casing contains a conductive coating disposed on a surface of a metal substrate, the conductive coating containing:
   a discontinuous precoat layer that contains a plurality of discrete projections of a conductive material deposited over the surface of the metal substrate in a spaced-apart fashion so that the projections cover from about 5% to about 80% of the surface of the metal substrate; and
   a conductive polymer layer that overlies the discontinuous precoat layer, wherein the conductive polymer layer is formed by electrolytic polymerization of a colloidal suspension that includes a precursor monomer.

2. The wet electrolytic capacitor of claim 1, wherein the conductive material is a noble metal.

3. The wet electrolytic capacitor of claim 2, wherein the noble metal is palladium.

4. The wet electrolytic capacitor of claim 1, wherein the average size of the projections is from about 50 nanometers to about 500 micrometers.

5. The wet electrolytic capacitor of claim 1, wherein the precursor monomer includes a thiophene and the conductive polymer layer includes a polythiophene.

6. The wet electrolytic capacitor of claim 5, wherein the polythiophene is an optionally substituted poly(3,4-ethylene-dioxythiophene) having the following general structure:

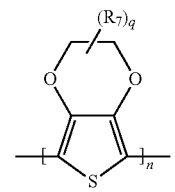

wherein,
$R_7$ is a linear or branched, optionally substituted $C_1$ to $C_{18}$ alkyl radical; optionally substituted $C_5$ to $C_{12}$ cycloalkyl radical; optionally substituted $C_6$ to $C_{14}$ aryl radical; optionally substituted $C_7$ to $C_{18}$ aralkyl radical; optionally substituted $C_1$ to $C_4$ hydroxyalkyl radical, or hydroxyl radical;
q is an integer from 0 to 8; and
n is from 2 to 5,000.

7. The wet electrolytic capacitor of claim 1, wherein the colloidal suspension includes a surfactant and a sulfonic acid.

8. The wet electrolytic capacitor of claim 7, wherein the surfactant is an alkyl arylene sulfonate.

9. The wet electrolytic capacitor of claim 7, wherein the sulfonic acid is an arylene sulfonic acid.

10. The wet electrolytic capacitor of claim 1, wherein the conductive polymer layer is free of high energy iron radicals.

11. The wet electrolytic capacitor of claim 1, wherein the metal substrate is formed from tantalum.

12. The wet electrolytic capacitor of claim 1, wherein the conductive coating further includes a hydrogen protection layer that is positioned between the metal substrate and the precoat layer, wherein the hydrogen protection layer contains a plurality of sintered valve metal agglomerates formed from a valve metal composition that are sintered to the metal substrate.

13. The wet electrolytic capacitor of claim 1, wherein a dielectric layer is formed on the metal substrate that is positioned between the substrate and the conductive coating.

14. The wet electrolytic capacitor of claim 1, wherein the anode includes tantalum.

15. The wet electrolytic capacitor of claim 1, wherein a plurality of longitudinally extending channels are recessed into the porous body.

16. The wet electrolytic capacitor of claim 1, wherein the working electrolyte is a liquid.

17. The wet electrolytic capacitor of claim 1, wherein the working electrolyte is an aqueous solution containing sulfuric acid.

18. The wet electrolytic capacitor of claim 1, wherein the working electrolyte has a pH value of from about 4.5 to about 8.0.

19. The wet electrolytic capacitor of claim 1, wherein the casing defines an opening and a sidewall surrounding an interior, and wherein a sealing assembly covers the opening.

20. A method for forming a casing of a wet electrolytic capacitor, the method comprising:
    forming a discontinuous precoat layer on a surface of a metal substrate, the precoat layer containing a plurality of discrete projections of a conductive material deposited over the surface of the metal substrate in a spaced-apart fashion so that the projections cover from about 5% to about 80% of the surface of the metal substrate;
    applying a colloidal suspension to the metal substrate, wherein the colloidal suspension comprises a precursor monomer;
    placing an electrode in contact with the metal substrate; and
    supplying a current feed to the electrode to induce electrolysis and oxidative polymerization of the precursor monomer, thereby forming a conductive polymer layer that overlies the precoat layer.

21. The method of claim 20, wherein the precursor monomer includes 3,4-alkylenedioxythiophene or a derivative thereof.

22. The method of claim 20, wherein the colloidal suspension includes a surfactant and sulfonic acid.

23. The method of claim 22, wherein the surfactant is an alkyl arylene sulfonate.

24. The method of claim 22, wherein the sulfonic acid is an arylene sulfonic acid.

25. The method of claim 20, wherein the colloidal suspension is free of high energy iron radicals.

26. The method of claim 20, wherein the precoat layer is formed by electroless plating.

27. The method of claim 20, wherein the precoat layer is subjected to a heat treatment at a temperature of from about 800° C. to about 1700° C.

28. The method of claim 20, wherein the precoat layer includes palladium.

29. The method of claim 20, wherein the metal substrate is formed from tantalum.

30. The method of claim 20, wherein a plurality of valve metal agglomerates are sintered to the surface of the metal substrate before the precoat layer is formed thereon.

* * * * *